US008149838B2

(12) United States Patent
Saladino et al.

(10) Patent No.: US 8,149,838 B2
(45) Date of Patent: *Apr. 3, 2012

(54) METHOD FOR SUPPRESSION INDEX REUSE AND PACKET CLASSIFICATION FOR PAYLOAD HEADER SUPPRESSION WITHIN A WIRELESS NETWORK

(75) Inventors: Anthony P. Saladino, Atlanta, GA (US); Rennie L. Gardner, Woodstock, GA (US); Michael R. Robinson, Atlanta, GA (US); Ajay Chandra V. Gummalla, Atlanta, GA (US)

(73) Assignee: Broadcom Corporation, Irvine, CA (US)

( * ) Notice: Subject to any disclaimer, the term of this patent is extended or adjusted under 35 U.S.C. 154(b) by 557 days.

This patent is subject to a terminal disclaimer.

(21) Appl. No.: 11/889,936

(22) Filed: Aug. 17, 2007

(65) Prior Publication Data

US 2008/0034395 A1 Feb. 7, 2008

Related U.S. Application Data

(63) Continuation of application No. 10/192,654, filed on Jul. 11, 2002.

(60) Provisional application No. 60/304,119, filed on Jul. 11, 2001.

(51) Int. Cl.
*H04L 12/56* (2006.01)
(52) U.S. Cl. ......... 370/392; 370/474; 370/477; 709/247
(58) Field of Classification Search .................. 370/241, 370/252, 253, 351, 389, 392, 464, 465, 470, 370/471, 474, 476; 375/219, 222, 240; 709/246, 709/247; 455/39, 500, 507, 509
See application file for complete search history.

(56) References Cited

U.S. PATENT DOCUMENTS

| | | | |
|---|---|---|---|
| 5,745,837 A | 4/1998 | Fuhrmann | |
| 5,757,417 A | 5/1998 | Aras et al. | |
| 5,883,901 A | 3/1999 | Chiu et al. | |
| 6,028,860 A | 2/2000 | Laubach et al. | |
| 6,209,000 B1 * | 3/2001 | Klein et al. | 707/741 |
| 6,233,607 B1 * | 5/2001 | Taylor et al. | 709/217 |
| 6,385,700 B2 * | 5/2002 | Johnson | 711/140 |
| 6,438,123 B1 * | 8/2002 | Chapman | 370/351 |
| 2002/0007417 A1 * | 1/2002 | Taylor et al. | 709/231 |
| 2002/0062394 A1 * | 5/2002 | Bunn et al. | 709/246 |
| 2002/0114343 A1 * | 8/2002 | Lioy et al. | 370/442 |
| 2002/0136291 A1 * | 9/2002 | Sala et al. | 375/240 |

OTHER PUBLICATIONS

Search Report for International Application No. PCT/US02/21896, issued on Mar. 13, 2003.
Notification of Transmittal of International Preliminary Examination Report of International Application No. PCT/US02/21896, issued on Jul. 31, 2003.

* cited by examiner

*Primary Examiner* — Seema S Rao
*Assistant Examiner* — Khoa Huynh
(74) *Attorney, Agent, or Firm* — Sterne, Kessler, Goldstein & Fox, P.L.L.C.

(57) ABSTRACT

A method is provided for payload header suppression within a wireless network in which a limited number of suppression indices are used to map suppression rules to data streams. Network resources are conserved by implementing precise classification algorithms to correctly identify incoming packets at the wireless device as belonging to a particular data stream, which ensures that a minimum number of suppression indices are utilized. Additionally, network resources are conserved by utilizing sophisticated algorithms for reusing suppression indices when new data streams are detected by the wireless device. One such reuse algorithm involves recycling the suppression index that has been least recently used in transmitting a packet with a suppressed payload header.

14 Claims, 14 Drawing Sheets

METHOD FOR SUPPRESSION INDEX REUSE AND PACKET CLASSIFICATION FOR PAYLOAD HEADER SUPPRESSION WITHIN A WIRELESS NETWORK

CROSS REFERENCE TO RELATED APPLICATIONS

This application is a continuation of U.S. patent application Ser. No. 10/192,654, entitled "Method, System, and Computer Program Product for Suppression Index Reuse and Packet Classification for Payload Header Suppression," filed Jul. 11, 2002, which in turn claims the benefit of U.S. Provisional Application Ser. No. 60/304,119, filed Jul. 11, 2001, entitled "Suppression Index Re-Use and Packet Classification for Payload Header Suppression in a Cable Modem System," both of which are incorporated herein by reference.

BACKGROUND OF THE INVENTION

1. Field of the Invention

The present invention is generally related to communication systems. More particularly, the present invention is related to cable modem systems and methods for transferring data.

2. Background

In conventional cable modem systems, a hybrid fiber-coaxial (HFC) network provides a point-to-multipoint topology for supporting data communication between a cable modem termination system (CMTS) at the cable headend and multiple cable modems (CM) at the customer premises. In such systems, information is broadcast downstream from the CMTS to the cable modems as a continuous transmitted signal in accordance with a time division multiplexing (TDM) technique. In contrast, information is transmitted upstream from each of the cable modems to the CMTS as short burst signals in accordance with a time division multiple access (TDMA) technique. The upstream transmission of data from the cable modems is managed by the CMTS, which allots to each cable modem specific slots of time within which to transfer data.

Conventional cable modem systems are asymmetrical in that there is considerably less bandwidth available for upstream transmissions than there is for downstream transmissions. This lack of upstream bandwidth is further exacerbated by the fact that the upstream channels must be shared by multiple cable modems. As a result, the conservation of upstream bandwidth is imperative in order to maintain overall system performance. This is particularly true where cable modem users are engaging in activities that require both substantial upstream and downstream bandwidth, such as IP telephony, video teleconferencing, and Internet gaming.

Several industry standards or protocols have evolved to address these concerns. Conventional cable modem systems utilize equipment and protocols that are compliant with the Data Over Cable System Interface Specification (DOCSIS) to carry out the transfer of data packets between multiple cable modems and a CMTS. The term DOCSIS generally refers to a group of specifications published by CableLabs that define industry standards for cable headend and cable modem equipment. In part, DOCSIS sets forth requirements and objectives for various aspects of cable modem systems, including operations support systems, management, data interfaces, as well as network layer, data link layer, and physical layer transport for data over cable systems. The most current version of DOCSIS is DOCSIS 1.1.

One technique specified by DOCSIS to conserve upstream bandwidth involves Payload Header Suppression (PHS). PHS, as defined by DOCSIS 1.1, allows the suppression of unnecessary Ethernet/IP header information in the payload of a DOCSIS packet by the cable modem and subsequent reconstruction of the header by the CMTS. The goal of PHS is to reduce the number of bits transferred per packet, thereby improving network bandwidth utilization. However, DOCSIS PHS (DPHS) only permits header suppression based on the presence of redundant header bytes in sequentially transmitted packets.

What is needed is a flexible and efficient payload header suppression technique that addresses the above-identified concerns.

BRIEF SUMMARY OF THE INVENTION

A method is provided for payload header suppression within a wireless network in which a limited number of suppression indices is used to map suppression rules to data streams. The present invention conserves network resources by implementing precise classification algorithms to correctly identify incoming packets at the wireless device as belonging to a particular data stream, which ensures that a minimum number of suppression indices are utilized. Additionally, the present invention conserves network resources by utilizing sophisticated algorithms for reusing suppression indices when new data streams are detected by the wireless device.

In an embodiment, the reuse algorithm involves recycling the suppression index that has been least recently used to transmit a packet with a suppressed payload header. In another embodiment, the reuse algorithm involves recycling the suppression index most similar to a newly detected data stream. In another embodiment, the least often used suppression index is selected and recycled according to the reuse algorithm.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art(s) to make and use the invention.

Figure 1:
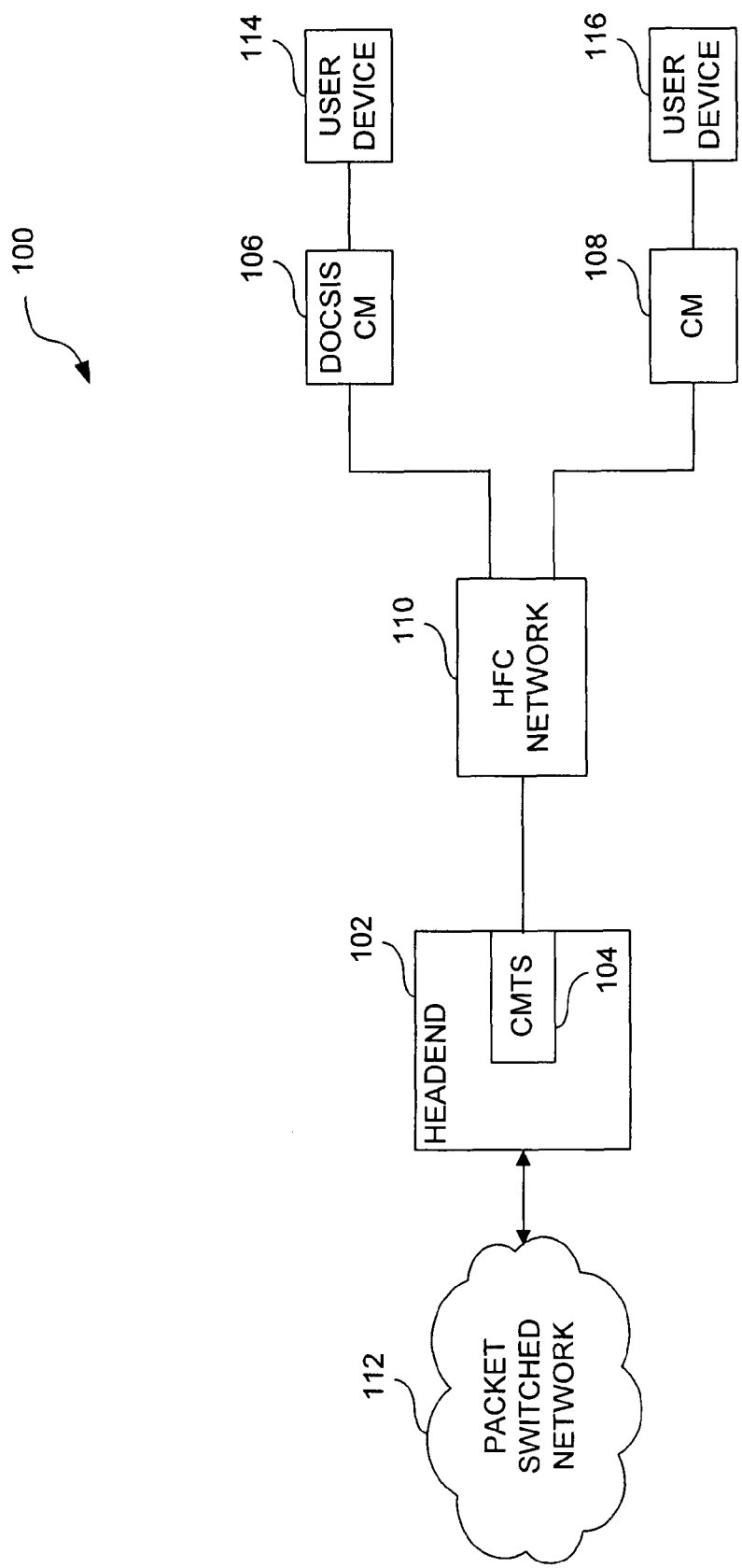
FIG. 1 is a high level block diagram of a cable modem system in accordance with embodiments of the present invention.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

Table of Contents

| | |
|---|---|
| I. | Introduction |
| II. | Cable Modem System Overview |
| III. | Cable Modem System Components |
| IV. | Suppression Index Assignment and Packet Classification |
| V. | Suppression Index Reuse |
| VI. | Allotting Suppression Indices for Assignment and/or Reuse |
| VII. | Cable Modem and CMTS Handshake |
| VIII. | Exemplary System Implementation |

I. Introduction

The present invention is related to proprietary protocol-specific header suppression techniques that permit greater reduction in the size of payload headers within a given DOCSIS packet than that provided by DOCSIS 1.1. One such suppression technique involves the sending of a packet from a cable modem to the CMTS, wherein the packet includes a suppressed payload header and a payload header suppression index. The suppression index tells the CMTS the rules by which the suppressed payload header is to be reconstructed. For example, the suppression index can act as a pointer to a copy of the original payload header and a mask, or template, which indicates which payload header fields have and have not been suppressed. From this information, the CMTS can reconstruct a complete payload header from the suppressed payload header.

The above-described exemplary technique contemplates the use of a predetermined number of suppression indices per cable modem data flow. For example, as many as 255 suppression indices can be assigned to each cable modem data flow. However, the use of such a large number of suppression indices requires a significant amount of memory for a CMTS that manages a large number of cable modems. This is because the CMTS must be able to store rule information for each suppression index assigned to each cable modem data flow. The present invention provides a payload header suppression technique that works well with a very limited number of suppression indices assigned to each cable modem, or to each cable modem data flow.

II. Cable Modem System Overview

FIG. 1 is a high level block diagram of an example cable modem system 100 in accordance with embodiments of the present invention. The cable modem system 100 enables voice communications, video and data services based on a bi-directional transfer of packet-based traffic, such as Internet Protocol (IP) traffic, between a cable system headend 102 and a plurality of cable modems over a hybrid fiber-coaxial (HFC) cable network 110. In the example cable modem system 100, only two cable modems 106 and 108 are shown for clarity. In general, any number of cable modems can be included in the cable modem system of the present invention.

Cable headend 102 is comprised of at least one cable modem termination system (CMTS) 104. CMTS 104 is the portion of cable headend 102 that manages the upstream and downstream transfer of data between cable headend 102 and cable modems 106 and 108, which are located at the customer premises. CMTS 104 broadcasts information downstream to cable modems 106 and 108 as a continuous transmitted signal in accordance with a time division multiplexing (TDM) technique. Additionally, CMTS 104 controls the upstream transmission of data from cable modems 106 and 108 to itself by assigning to each cable modem 106 and 108 short grants of time within which to transfer data. In accordance with this time division multiple access (TDMA) technique, each cable modem 106 and 108 can only send information upstream as short burst signals during a transmission opportunity allocated to it by CMTS 104.

TDM/TDMA is described herein by way of example. It should be understood that the present invention could be configured to support other transmission modulation standards, including, but not limited to, Synchronous Code Division Multiple Access (S-CDMA) or the like, as would be apparent to one skilled in the relevant art(s). In an embodiment, WDM or DWDM is implemented to support optical communications.

As shown in FIG. 1, CMTS 102 further serves as interface between HFC network 110 and a packet-switched network 112. Thus, CMTS 102 is enabled to transfer IP packets received from cable modems 106 and 108 to packet-switched network 112, and transfer IP packets received from packet-switched network 112 to cable modems 106 and 108 when appropriate. In embodiments, packet-switched network 112 comprises the global Internet.

In accordance with the present invention, packet-switched network 112 includes a wired and/or wireless LAN or wide area network (WAN), such as an organization's intranet, a local internet, the global-based Internet (including the World Wide Web (WWW)), an extranet, a virtual private network, or the like. Packet-switched network 112 includes wired, wireless, or both transmission media, including satellite, terrestrial (e.g., fiber optic, copper, UTP, STP, coaxial, hybrid fiber-coaxial (HFC), or the like), radio, free-space optics (FSO), microwave, and/or any other form or method of transmission.

In addition to CMTS 104, cable headend 102 can also include one or more Internet routers to facilitate the connection between CMTS 104 and packet-switched network 112, as well as one or more servers for performing necessary network management tasks.

HFC network 110 provides a point-to-multipoint topology for the high-speed, reliable, and secure transport of data between the cable headend 102 and cable modems 106 and 108 at the customer premises. As will be appreciated by one skilled in the relevant art(s), HFC network 110 can comprise coaxial cable, fiber optic cable, or a combination of coaxial cable and fiber optic cable linked via one or more fiber nodes. In an embodiment, HFC network 110 is replaced with a wireless transmission medium (e.g., satellite, FSO, etc.), as described above with reference to packet-switched network 112.

Each of the cable modems 106 and 108 operates as an interface between HFC network 110 and at least one attached user device 114 or 116. In an embodiment, cable modems 106 and 108 perform the functions necessary to convert downstream signals received over HFC network 110 into, for example, Ethernet data packets for receipt by an attached user device 114 or 116. Additionally, cable modems 106 and 108 perform the functions necessary to convert the Ethernet data packets received from the attached user device 114 or 116 into upstream burst signals suitable for transfer over HFC network 110. In embodiments, cable modems 106 and 108 format the data packets to support wired or wireless exchanges with the user devices 114 and 116.

In the example cable modem system 100, each cable modem 106 and 108 is shown supporting only a single user device 114 and 116 for clarity. In general, each cable modem 106 and 108 is capable of supporting a plurality of user devices 114 and 116 for communications over cable modem system 100. User devices 114 and 116 can include personal computers, data terminal equipment, telephony devices, broadband media players, network-controlled appliances, personal digital assistants, personal or enhanced function televisions, set-top boxes, or any other device capable of transmitting or receiving data over a packet-switched network.

In the example cable modem system 100, cable modem 106 represents a conventional DOCSIS-compliant cable modem. In other words, cable modem 106 transmits data packets to CMTS 104 in formats that adhere to the protocols set forth in DOCSIS. Cable modem 108 is likewise capable of transmitting data packets to CMTS 104 in standard DOCSIS formats. However, in accordance with embodiments of the present invention, cable modem 108 is also configured to transmit data packets to CMTS 104 in accordance with proprietary protocol-specific payload header suppression techniques that extend beyond DOCSIS, but does not violate the specification. The manner in which cable modem 108 operates to transfer data to CMTS 104 will be described in further detail herein.

Furthermore, in the example cable modem system 100, CMTS 104 operates to receive and process data packets transmitted to it in accordance with the protocols set forth in DOCSIS. However, in accordance with embodiments of the present invention, CMTS 104 also operates to receive and process data packets that are formatted using proprietary protocol-specific payload header suppression techniques that extend beyond those provided by DOCSIS, such as data packets transmitted by cable modem 108. The manner in which CMTS 104 operates to receive and process data will also be described in further detail herein.

III. Cable Modem System Components

Figure 2:
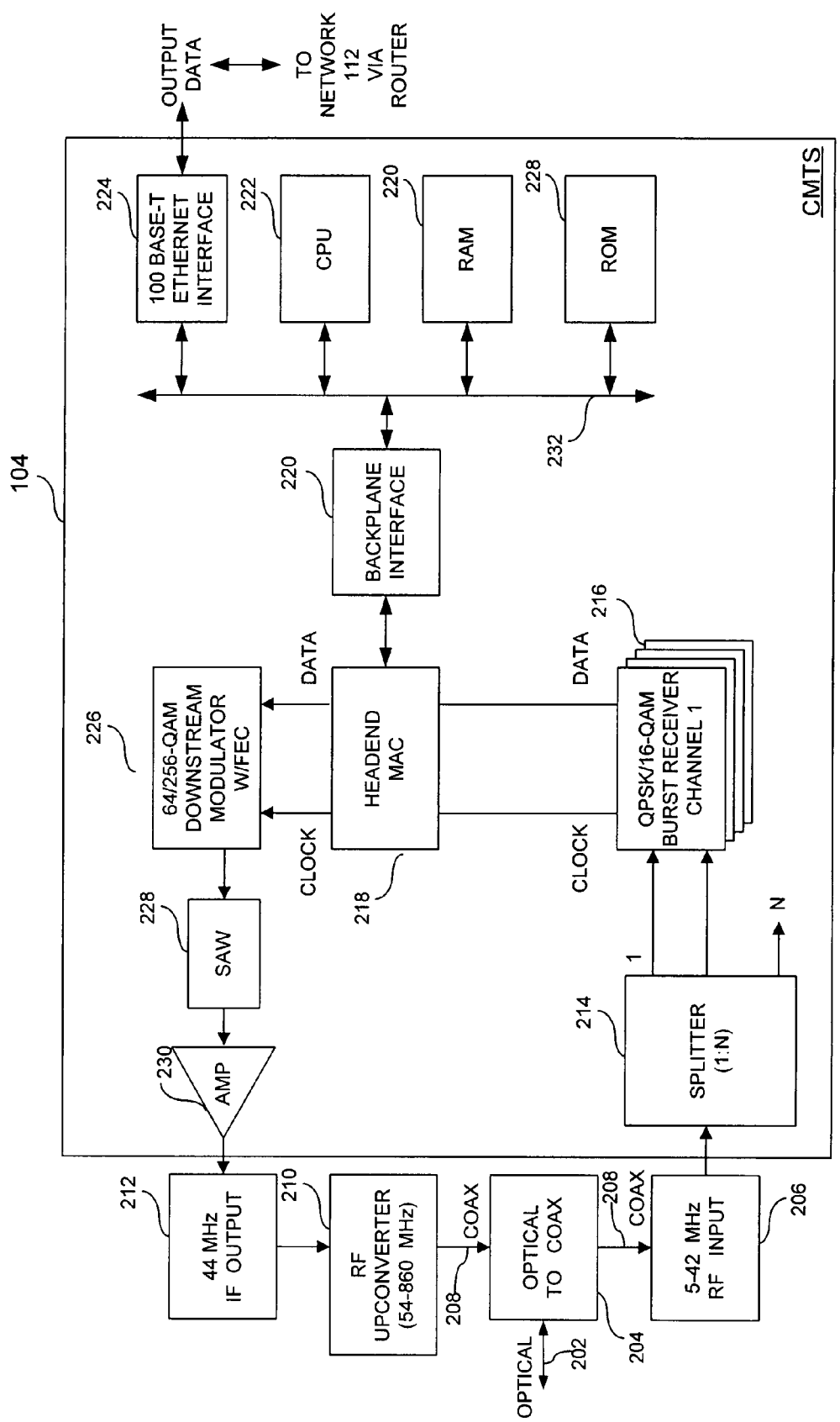
FIG. 2 is a schematic block diagram of a cable modem termination system (CMTS) in accordance with embodiments of the present invention.

FIG. 2 depicts a schematic block diagram of an implementation of CMTS 104 of cable modem system 100, which is presented by way of example, and is not intended to limit the present invention. CMTS 104 is configured to receive and transmit signals to and from HFC network 110, a portion of which is represented by an optical fiber 202 of FIG. 2. Accordingly, CMTS 104 will be described in terms of a receiver portion and a transmitter portion.

The receiver portion includes an optical-to-coax stage 204, a radio frequency (RF) input 206, a splitter 214, and a plurality of burst receivers 216. Reception begins with the receipt of upstream burst signals originating from one or more cable modems (e.g., cable modems 106 and/or 108) by optical-to-coax stage 204 via optical fiber 202. Optical-to-coax stage 204 routes the received burst signals to RF input 206 via a coaxial cable 208. In embodiments, these upstream burst signals have spectral characteristics within the frequency range of roughly 5-42 MHz.

The received signals are provided by RF input 206 to splitter 214, which separates the RF input signals into N separate channels. Each of the N separate channels is then provided to a separate burst receiver 216 which operates to demodulate the received signals on each channel in accordance with either a Quadrature Phase Shift Key (QPSK) or 16 Quadrature Amplitude Modulation (QAM) technique to recover the underlying information signals. Each burst receiver 216 also converts the underlying information signals from an analog form to digital form. This digital data is subsequently provided to a headend media access control (MAC) 218.

Headend MAC 218 operates to process the digital data in accordance with DOCSIS and, when appropriate, in accordance with proprietary protocol-specific payload header suppression techniques that extend beyond DOCSIS, as will be described in further detail herein. The functions of headend MAC 218 can be implemented in hardware or in software. In the example implementation of FIG. 2, the functions of headend MAC 218 are implemented both in hardware and software. Software functions of headend MAC 218 can be stored in either a random access memory (RAM) 220 or a read-only memory (ROM) 228 and executed by a CPU 222. Headend MAC 218 communicates with these elements via a backplane interface 220 and a shared communications medium 232. In embodiments, shared communications medium 232 comprises a computer bus, a multiple access data network, or the like.

Headend MAC 218 also communicates with an Ethernet interface 224 via both backplane interface 220 and shared communications medium 232. When appropriate, Ethernet packets recovered by headend MAC 218 are transferred to Ethernet interface 224 for delivery to packet-switched network 112 via a router.

The transmitter portion of CMTS 104 includes a downstream modulator 226, a surface acoustic wave (SAW) filter 228, an amplifier 230, an intermediate frequency (IF) output 212, a radio frequency (RF) upconverter 210, and optical-to-coax stage 204. Transmission begins with the generation of a digital broadcast signal by headend MAC 218. The digital broadcast signal can include data originally received from packet-switched network 112 via Ethernet interface 224. Headend MAC 218 outputs the digital broadcast signal to downstream modulator 226 which converts it into an analog form and modulates it onto a carrier signal in accordance with either a 64-QAM or 256-QAM technique.

The modulated carrier signal output by downstream modulator 226 is input to SAW filter 228 which passes only spectral components of the signal that are within a desired bandwidth. The filtered signal is then output to amplifier 230 which amplifies it and outputs it to IF output 212. IF output 212 routes the signal to RF upconverter 210, which upconverts the signal. In embodiments, the upconverted signal has spectral characteristics in the frequency range of approximately 54-860 MHz. The upconverted signal is then output to the optical-to-coax stage 204 over a coaxial cable 208. The optical-to-coax stage 204 broadcasts the signal via optical fiber 202 of HFC network 110.

Figure 3:
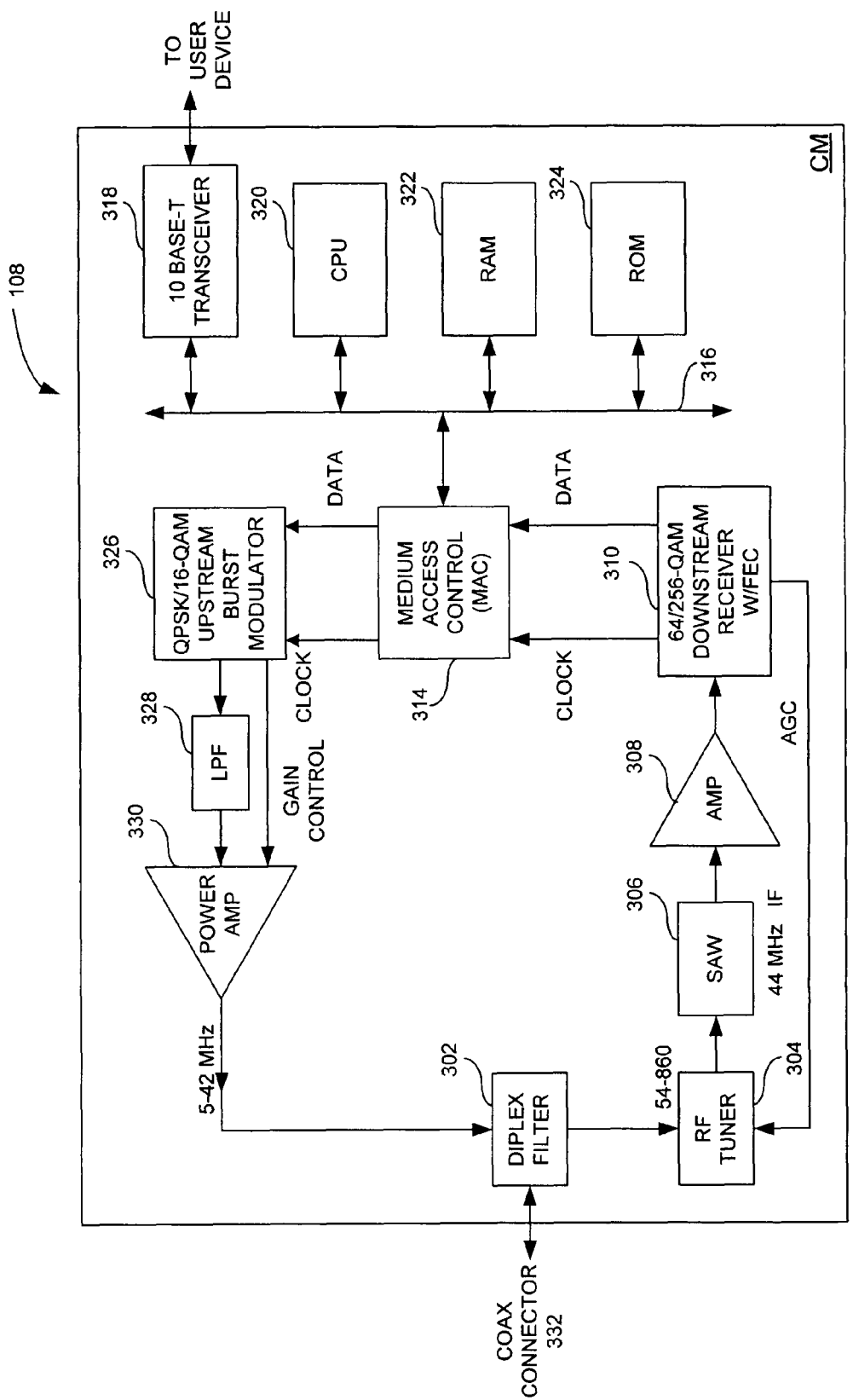
FIG. 3 is a schematic block diagram of a cable modem in accordance with embodiments of the present invention.

FIG. 3 depicts a schematic block diagram of an implementation of cable modem 108 of cable modem system 100, which is presented by way of example, and is not intended to limit the present invention. Cable modem 108 is configured to receive and transmit signals to and from HFC network 110 via a coaxial connector 332 of FIG. 3. Accordingly, cable modem 108 will be described in terms of a receiver portion and a transmitter portion.

The receiver portion includes a diplex filter 302, a RF tuner 304, a SAW filter 306, an amplifier 308, and a downstream receiver 310. Reception begins with the receipt of a downstream signal originating from CMTS 104 by diplex filter 302. Diplex filter 302 operates to isolate the downstream signal and route it to RF tuner 304. In embodiments, the downstream signal has spectral characteristics in the frequency range of roughly 54-860 MHz. RF tuner 304 downconverts the signal and outputs it to SAW filter 306, which passes only spectral components of the downconverted signal that are within a desired bandwidth. The filtered signal is output to amplifier 308 which amplifies it and passes it to downstream receiver 310. Automatic gain controls are provided from the downstream receiver 310 to RF tuner 304.

Downstream receiver 310 demodulates the amplified signal in accordance with either a 64-QAM or 256-QAM technique to recover the underlying information signal. Downstream receiver 310 also converts the underlying information signal from an analog form to digital form. This digital data is subsequently provided to a media access control (MAC) 314.

MAC 314 processes the digital data, which can include, for example, Ethernet packets for transfer to an attached user device 116. The functions of MAC 314 can be implemented in hardware or in software. In the example implementation of FIG. 3, the functions of MAC 314 are implemented in both hardware and software. Software functions of MAC 314 can be stored in either a RAM 322 or a ROM 324 and executed by a CPU 320. MAC 314 communicates with these elements via a shared communications medium 316. In embodiments, shared communications medium 316 comprises a computer bus, a multiple access data network, or the like.

MAC 314 also communicates with an Ethernet interface 318 via shared communications medium 316. When appropriate, Ethernet packets recovered by MAC 314 are transferred to Ethernet interface 318 for transfer to an attached user device 116.

The transmitter portion of cable modem 108 includes an upstream burst modulator 326, a low pass filter (LPF) 328, a power amplifier 330, and diplex filter 302. Transmission begins with the construction of a data packet by MAC 314. The data packet can include data originally received from an attached user device 116 via Ethernet interface 318, which can be referred to as a "payload." In accordance with embodiments of the present invention, MAC 314 formats the data packet in compliance with the protocols set forth in DOCSIS or, when appropriate, formats the data packet in compliance with proprietary protocol-specific payload header suppression techniques that extends beyond those set forth in DOCSIS, as will be described in further detail herein. MAC 314 outputs the data packet to upstream burst modulator 326 which converts it into analog form and modulates it onto a carrier signal in accordance with either a QPSK or 16-QAM technique.

Upstream burst modulator 326 outputs the modulated carrier signal to low pass filter 328 which passes signals with spectral characteristics in a desired bandwidth. In embodiments, the desired bandwidth is within the frequency range of approximately 5-42 MHz. The filtered signals are then introduced to power amplifier 330 which amplifies the signal and provides it to diplex filter 302. The gain in power amplifier 330 is regulated by burst modulator 326. Diplex filter 302 isolates the amplified signal and transmits it upstream over HFC network 110 via coaxial connector 332 during a scheduled burst opportunity.

IV. Suppression Index Reuse and Packet Classification

As noted above, in embodiments of the present invention, cable modem 108 modifies packets in accordance with a proprietary protocol-specific payload header suppression technique, and transmits the modified packets to CMTS 104. Upon receipt of the modified packets, CMTS 104 reconstructs them in accordance with the same payload header suppression technique.

The present invention enables cable modem 108 to classify incoming packets efficiently and precisely based on a particular flow, service, quality of service, and/or like parameter. Additionally, cable modem 108 assigns a suppression index for a proprietary protocol-specific payload header suppression technique that is based on the aforementioned parameter(s). Therefore, cable modem 108 is enabled to assure that incoming packets are suppressed using the best choice of suppression index. Although embodiments of the present invention are described below with reference to using a "data flow" to classify packets, other parameters can be implemented and are considered to be within the scope of the present invention.

In embodiments of the present invention, CMTS 104 allocates a predetermined number of suppression indices per cable modem data flow. For example, DOCSIS allows up to 255 suppression indices to be assigned to each cable modem data flow. However, the use of such a large number of suppression indices poses a substantial memory requirement for CMTS 104 since it is scaleable to manage a large number of cable modems (e.g., cable modem 106 and cable modem 108). The memory demands exist because CMTS 104 must be able to store rule information for each suppression index assigned to each cable modem data flow.

In other embodiments of the present invention, CMTS 104 utilizes a limited number of suppression indices to support payload header suppression while still providing substantially improved network bandwidth utilization and memory conservation. Embodiments of the present invention achieve this end by utilizing precise packet classification algorithms to ensure that packets incoming to cable modem 108 (e.g., from user device 116) are suppressed using the best choice of suppression index, as previously discussed. Moreover, the present invention provides methodologies and/or techniques for reusing the limited number of suppression indices that are allocated to cable modem 108 by CMTS 104.

Figure 4:
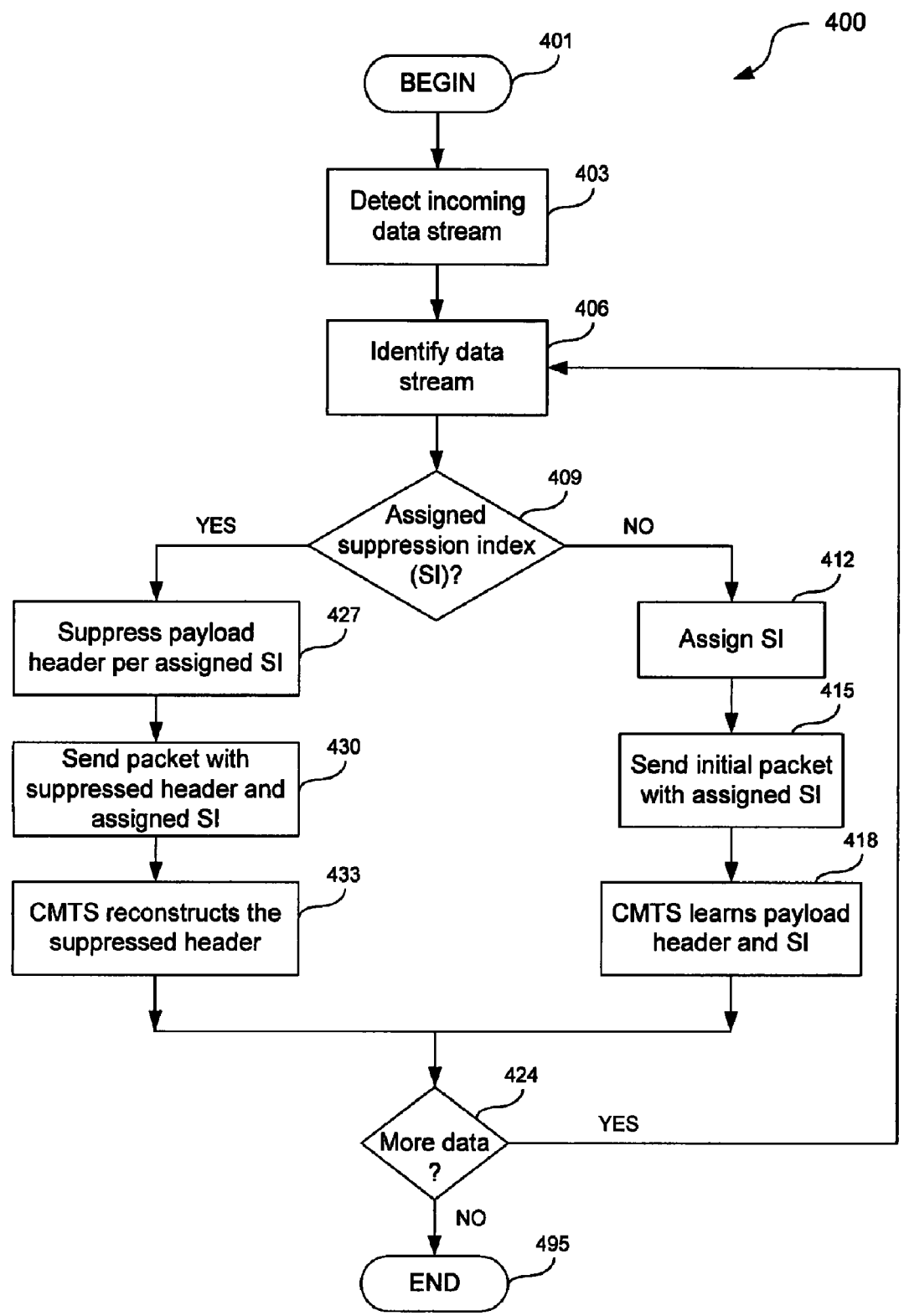
FIG. 4 is an operational flow for assigning and reusing suppression indices in accordance with an embodiment of the present invention.

Packet classification and suppression index reuse, according to the present invention, can be described with reference to FIG. 4. It should be understood that FIG. 4 has been provided by way of example, and not limitation. Referring to FIG. 4, flowchart 400 represents the general operational flow of an embodiment of the present invention. More specifically, flowchart 400 shows an example of a control flow for assigning suppression indices for a payload header suppression technique.

The control flow of flowchart 400 begins at step 401 and passes immediately to step 403. At step 403, cable modem 108 detects an incoming data stream (e.g., from user device 116). It should be understood that the expression "data stream," as used herein, is being used by way of example, not limitation. Data stream includes text, graphics, audio, video, voice (including voice-over-IP), or any other type of media or multimedia.

At step 406, cable modem 108 identifies and/or classifies the incoming data stream as a data stream for which it wishes to use payload header suppression. In accordance with embodiments of the present invention, cable modem 108 identifies unique data streams by analyzing various fields in the protocol headers of packets received from user device 116, such as various fields in, for example, TCP and UDP protocol headers. In embodiments of the present invention, cable modem 108 classifies the data stream based on the field analysis. For example, the data stream can be classified as corresponding to a particular data flow. Moreover, the data flow can be classified as a TCP or UDP flow by analyzing the protocol field in the IP header. Furthermore, the combination of the Source IP Address and Port fields and the Destination IP Address and Port fields can be used to uniquely identify a TCP or UDP flow for classification purposes. Again, TCP and UDP are described by way of example. Other transport protocols can be implemented with the present invention.

Referring back to FIG. 3, in accordance with embodiments of the present invention, packet classification is performed by software stored in RAM 322 and executed by CPU 320. In alternate embodiments, packet classification is performed by hardware within cable modem 108, such as by the MAC 314.

At step 409, cable modem 108 determines whether a suppression index has been assigned to the corresponding data flow for the identified data stream. If a suppression index has not been assigned, the control flow passes to step 412. Otherwise, the control flow passes to step 409.

At step 412, cable modem 108 assigns a suppression index to the identified data stream. The suppression index indicates, in part, the protocol-specific header suppression technique that cable modem 108 will use to suppress payload headers in the data stream. In an embodiment, the payload header suppression technique differs depending upon whether the data stream corresponds to a TCP data flow, RTP data flow, UDP data flow, or the like. Thus, the suppression index is chosen to select a suppression technique that is best suited for the specified data stream.

At step 415, cable modem 108 sends a first packet in the data stream in an unsuppressed form to the CMTS 104 along with the assigned suppression index and a request for the CMTS 104 to "learn" the payload header.

At step 418, CMTS 104 learns the payload header. In an embodiment, CMTS 104 learns the payload header by storing the payload header in memory for use in restoring suppressed payload headers in subsequently received packets. CMTS 104 also associates the received suppression index with the stored payload header.

At step 424, cable modem 108 determines if additional packets are available to be sent upstream. If additional packets are detected, the control flow passes back to step 406. On return to step 406, cable modem 108, once again, identifies the data stream, and at step 409, cable modem 108 determines if a suppression index has been assigned to the corresponding data flow. Therefore, if subsequent packets are available for the data stream that has been learned at step 415, the control flow essentially passes to step 427.

At step 427, cable modem 108 suppresses the payload header for the subsequent packet in accordance with the designated protocol-specific payload header suppression technique for the assigned suppression index. At step 430, cable modem 108 sends the subsequent packet upstream towards CMTS 104.

At step 433, CMTS 104 receives the suppressed packet and reads the suppression index. The suppression index tells CMTS 104 the rules by which the suppressed payload header is to be reconstructed. For example, the suppression index can act as a pointer to a copy of the original payload header and a mask, or template, which indicates which payload header fields have and have not been suppressed. From this information, CMTS 104 reconstructs a complete payload header from the suppressed payload header.

After all available packets, detected at step 424, have been transmitted, the control flow ends as indicated at step 495. In short, once a unique data flow has been classified by cable modem 108, an appropriate suppression index is assigned to the data flow. Because protocol-specific payload header suppression techniques are utilized, the correct classification of a data stream ensures that the appropriate payload header suppression technique is applied to the stream for maximum suppression. Moreover, the ability to correctly identify a stream of packets as belonging to a particular data flow ensures that a minimum number of unsuppressed learned packets are sent upstream to cable modem 108 and, correspondingly, a minimum number of suppression indices are utilized.

V. Suppression Index Reuse

As described above, in embodiments of the present invention, cable modem 108 is allotted a limited number of suppression indices. Each of the suppression indices can be assigned to a unique data flow. In the event that each allotted suppression index is assigned to a respective data flow and a new data flow subsequently is identified, the present invention includes embodiments for reusing the allotted suppression index. As such, cable modem 108 utilizes one or more suppression index reuse algorithms to intelligently determine which of the suppression indices currently in use should be recycled for assignment to the new data flow. In an embodiment, the recycled suppression index is shared by the new data flow and the earlier assigned data flow. Therefore, both data flows would use the same suppression index and corresponding payload header suppression technique. In another embodiment, the recycled suppression index is disassociated from the earlier assigned data flow when it is assigned to the new data flow. Therefore, the new data flow would be the exclusive user of the recycled suppression index and its corresponding payload header suppression technique.

In embodiments, these algorithms are implemented in software stored in RAM 322 of cable modem 108 and executed by CPU 320. Alternately, the suppression index reuse algorithms can be performed by hardware within cable modem 108, such as by MAC 314. Additionally, as described in greater detail below, the suppression index reuse algorithms described herein can also be performed by CMTS 104.

One suppression index reuse algorithm involves "aging" each suppression index according to the last time it was used to send a suppressed packet. Thus, suppression indices can be ranked from "most recently used" to "least recently used." When cable modem 108 detects a new data flow that does not correspond to one of the assigned suppression indices, the "least recently used" suppression index is recycled. Recycling is achieved by assigning the "least recently used" suppression index to the new data flow and by sending a new "learn" packet, including the recycled suppression index, to CMTS 104.

Figure 5:
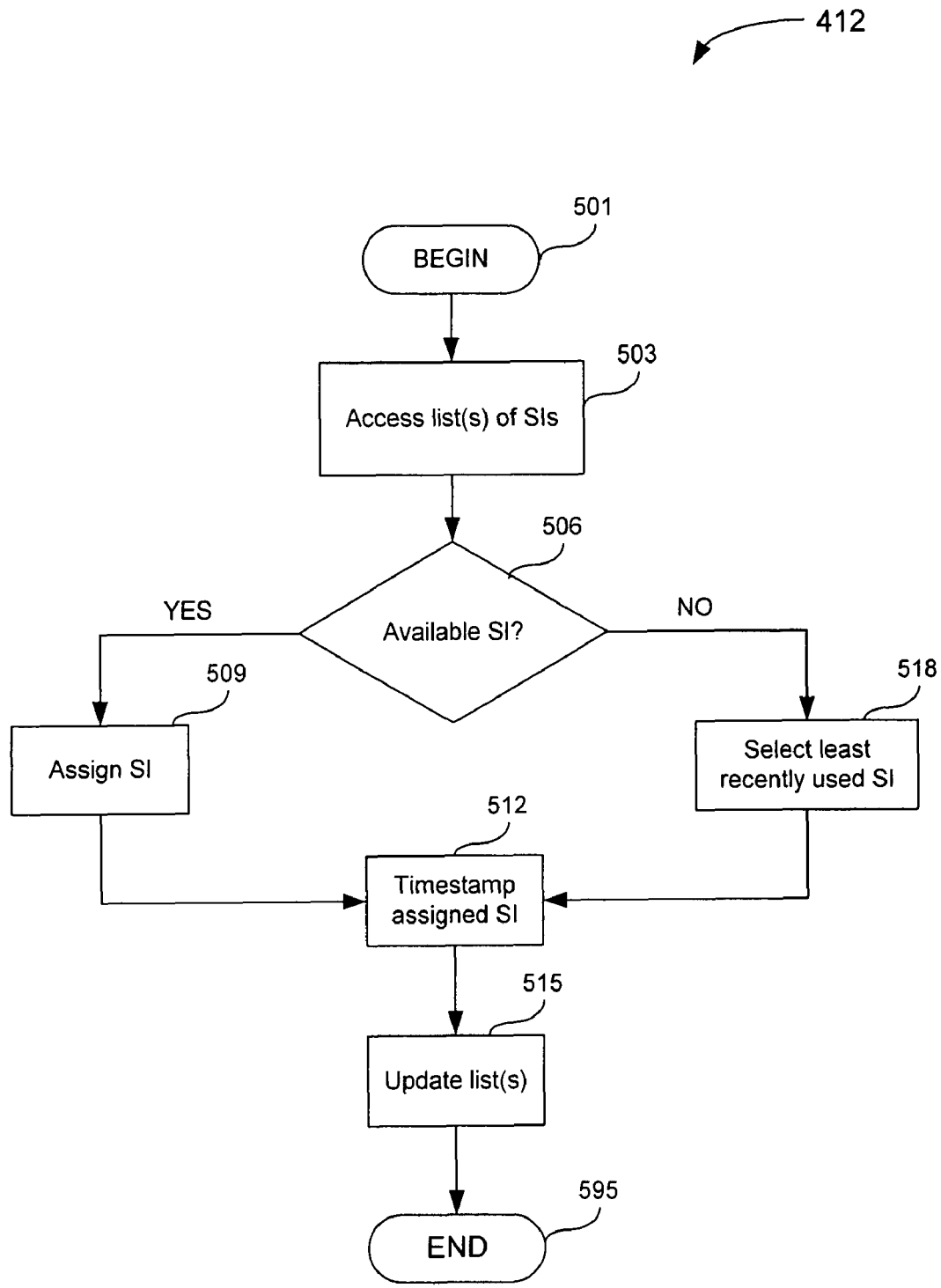
FIG. 5 is an operational flow for assigning and reusing suppression indices in accordance with another embodiment of the present invention.

An implementation of the aging process can be described with reference to FIG. 4 and FIG. 5. As described with reference to step 412 of FIG. 4, cable modem 108 assigns a suppression index to a newly detected data flow. Referring to FIG. 5, flowchart 412 represents another embodiment of step

412. More specifically, flowchart 412 shows an example of a control flow for assigning and reusing suppression indices for a payload header suppression technique.

The control flow of flowchart 412 begins at step 501 and passes immediately to step 503. At step 503, cable modem 108 accesses a list of suppression indices that have been "allotted" to cable modem 108 by CMTS 104. As will be described later, cable modem 108 also tracks each suppression index that has been "assigned" to a data flow. This can be implemented by keeping a second list of assigned suppression indices, or by modifying a data field in the listing of allotted suppression indices.

At step 506, cable modem 108 determines whether all allotted suppression indices have been assigned to a data flow. If not, the control flow passes to step 509. At step 509, a suppression index is assigned to the data flow as discussed above with reference to FIG. 4. At step 512, the assigned suppression index receives a time stamp. At step 515, the list of suppression indices is updated to indicate that a particular suppression index has been assigned to a data flow. This list also notes the time stamp. As previously discussed, a separate list can be established to track assigned suppression indices and their respective time stamps. Alternatively, the aforementioned list of allotted indices can be modified to track the assignment and time stamps of each suppression index. Other methods or techniques can be used as would be apparent to one skilled in the relevant art(s).

On the other hand, if at step 506 all allotted suppression indices have been assigned to a data flow, the control flow passes to step 518. At step 518, the "least recently used" suppression index is selected and recycled. To select the least recently used suppression index, the list that is updated at step 515 is queried to select the suppression index having the oldest time stamp. Thus, recycling is achieved by assigning the "least recently used" suppression index to a newly detected data flow.

After the suppression index has been selected and/or recycled, the control flow passes to step 512. At step 512, the recycled suppression index receives an updated time stamp. At step 515, the list of assigned suppression indices is updated to note the recycling event.

Accordingly, flowchart 412 describes an embodiment for assigning (at step 509) or reusing (at step 518) suppression indices. Once a suppression index has been assigned or reused, the control flow ends as indicated at step 595. Referring back to FIG. 4, control passes to step 415 where a new "learn" packet is sent to CMTS 104 along with the recycled suppression index.

Figure 6:
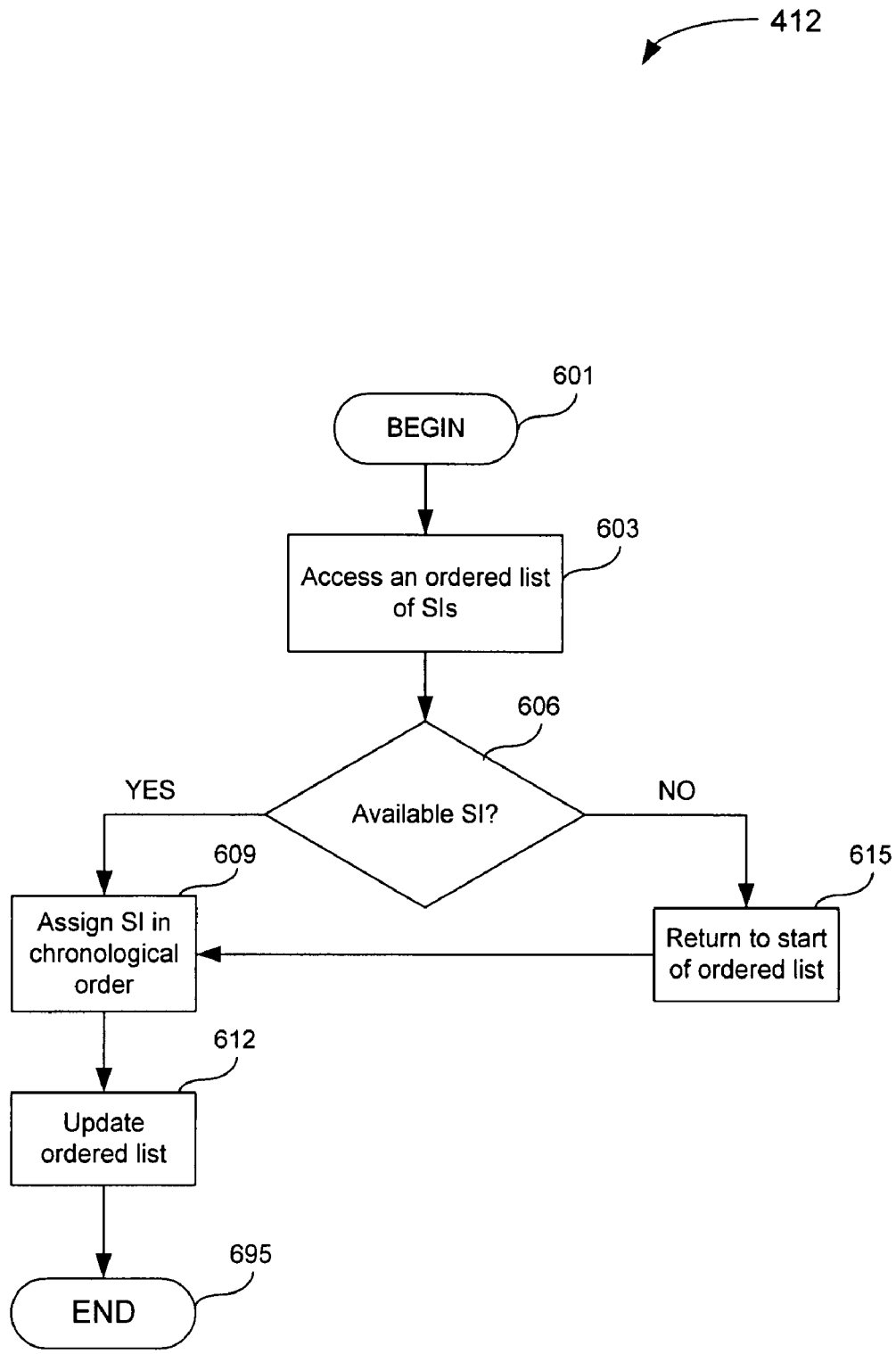
FIG. 6 is an operational flow for assigning and reusing suppression indices in accordance with another embodiment of the present invention.

The age of a suppression index can be monitored in a number of ways. As described above with reference to FIG. 5, the age of the suppression index is monitored by storing time stamps associated with each suppression index. The time stamps indicate the last time the suppression index has been used to send a suppressed packet. Alternately, an ordered list can be utilized that stores suppression indices from most recently used to least recently used. When a suppression index is recycled, it is removed from the bottom of the list and assigned to the new data flow. An implementation of an aging processing using an ordered list is described with reference to FIG. 6. Referring to FIG. 6, flowchart 412 represents another embodiment of step 412. More specifically, flowchart 412 shows a second example of a control flow for assigning and reusing suppression indices for a payload header suppression technique.

The control flow of flowchart 412 begins at step 601 and passes immediately to step 603. At step 603, cable modem 108 accesses a list of suppression indices that have been "allotted" to cable modem 108 by CMTS 104. As will be described later, cable modem 108 also tracks each suppression index that has been "assigned" to a data flow. This can be implemented by keeping a second list of assigned suppression indices, or by modifying a data field in the list of allotted suppression indices.

At step 606, cable modem 108 determines whether all allotted suppression indices have been assigned to a data flow. If not, the control flow passes to step 609. At step 609, a suppression index is assigned to the data flow as discussed above with reference to FIG. 4. At step 612, the list of suppression indices is updated to indicate that a particular suppression index has been assigned to a data flow. Unlike the control flow described with reference to FIG. 5, the updated list does not track a time stamp. Instead, a list is created or modified to track the chronological order in which the suppression indices are being assigned to data flows. In an embodiment, a separate ordered list is established to track assigned suppression indices. In another embodiment, the aforementioned list of allotted indices is modified to track the assignment order for each suppression index. Other methods or techniques can be used as would be apparent to one skilled in the relevant art(s).

On the other hand, if at step 606 all allotted suppression indices have been assigned to a data flow, the control flow passes to step 615. At step 615, cable modem 108 returns to the beginning of the ordered list that was updated at step 612. Then, at step 609, a suppression index is assigned by selecting the suppression index at the beginning of the list, and moving it to the most recently used position at the end of the list. As each suppression index is used, it is moved to the end of the list, and the least recently used suppression index naturally floats to the beginning of the list. Therefore, each future selection is determined by pulling from the beginning of the list. As such, the "least recently used" suppression index is selected and recycled.

After the suppression index has been selected and recycled, the control flow passes to step 612 where the ordered list is once again updated to note the recycling event. After a suppression index has been assigned or reused, the control flow ends as indicated at step 695.

As described above, age is determined by considering the time, or order, in which a suppression index is "assigned" to a data flow. However, in another embodiment, age is determined from the time that each suppression index is last used to "send" a suppressed packet. As such, referring back to step 430 of FIG. 4, each time a packet is sent upstream with its assigned suppression index, a time stamp is noted (as discussed in FIG. 5) or the ordered list is updated (as discussed in FIG. 6) to reflect this operation. Accordingly, the oldest suppression index is selected and recycled as determined by the last time a packet is sent with the suppression index.

Figure 7:
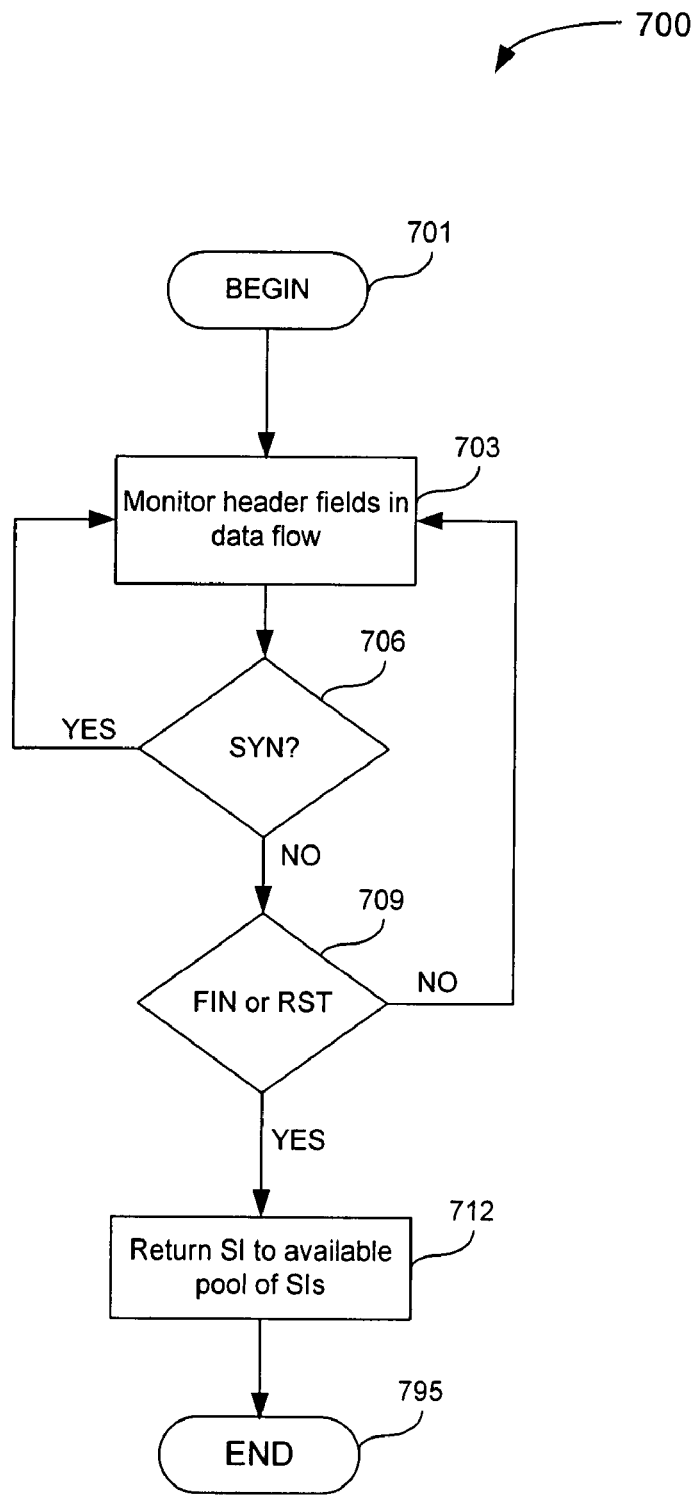
FIG. 7 is an operational flow for reusing suppression indices in accordance with an embodiment of the present invention.

The reuse algorithms described above can be implemented regardless of whether an assigned suppression index is still being used by a data flow. As such, it is conceivable that multiple data flows can use the same suppression index at any given time. In another embodiment of the present invention, data flows are monitored to determine when a suppression index is no longer being used by an earlier assigned data flow and, therefore, is available for reuse. Referring to FIG. 7, flowchart 700 represents an embodiment of the present invention. More specifically, flowchart 700 shows an example of a control flow for monitoring data flow for reusing suppression indices.

The control flow of flowchart 700 begins at step 701 and passes immediately to step 703. At step 703, cable modem 108 monitors the header fields in a data flow. For example, if the data flow has been formatted to support a TCP transport protocol, cable modem 108 would monitor the TCP header fields in a TCP data flow. Although flowchart 700 is described with reference to a TCP transport protocol, other protocols can be implemented in the present invention, including without limitation, UDP, RTP, etc.

At step 706, cable modem 108 checks to determine whether the SYN flag in the TCP header has been set. The SYN flag denotes the start of a TCP data flow. According to embodiments of the present invention, the SYN flag is used as an indication of a new data flow, and a suppression index from a pool of allotted suppression indices is selected and assigned to the data flow. Nonetheless, cable modem 180 continues to monitor the SYN flag until there is a change in state.

If the SYN flag is not set, at step 709, cable modem 108 checks to determine if the FIN or RST flag in the TCP header has been set. If not, cable modem 108 continues to monitor the data flow. Otherwise, cable modem 108 interprets FIN or RST flag as being an indication that the TCP connection has been terminated. Accordingly, when the FIN or RST flags are detected, control passes to step 712 and the suppression index assigned to that data flow is freed and returned to the pool of free suppression indices. Control then ends as indicated at step 795.

Figure 8:
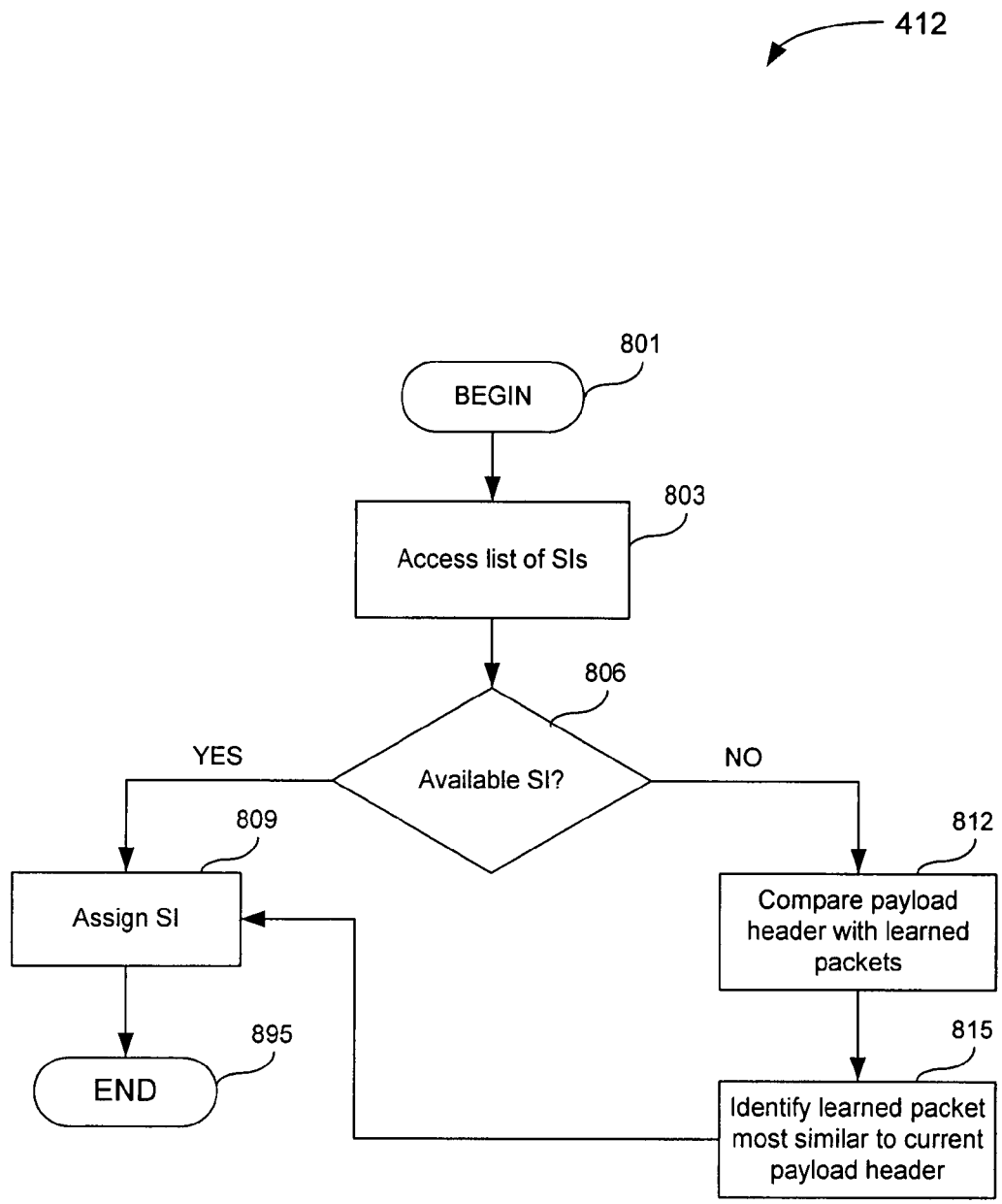
FIG. 8 is an operational flow for assigning and reusing suppression indices in accordance with another embodiment of the present invention.

Referring to FIG. 8, flowchart 412 represents another embodiment of the present invention. More specifically, flowchart 412 shows an alternative embodiment of step 412 and provides another example of a control flow for assigning and reusing suppression indices.

The control flow of flowchart 412 begins at step 801 and passes immediately to step 803. At step 803, cable modem 108 accesses a list of suppression indices that have been "allotted" to cable modem 108 by CMTS 104.

At step 806, cable modem 108 determines whether all allotted suppression indices have been assigned to a data flow. If not, the control flow passes to step 809. At step 809, a suppression index is assigned to the data flow as discussed above with reference to FIG. 4.

On the other hand, if at step 806 all allotted suppression indices have been assigned to a data flow, the control flow passes to step 812. At step 812, cable modem 108 compares the payload header of the new packet from the new data flow with the payload header of each "learn" packet that has already been associated with a suppression index.

At step 815, the suppression index associated with the payload header of the "learn" packet that is most similar to the payload header of the new packet (i.e., has the fewest number of different bits) is identified. Then at step 809, the identified suppression index is assigned to the newly detected data flow. After a suppression index has been assigned or reused, the control flow ends as indicated at step 895. This embodiment operates on the assumption that the similarity of the payload headers is a likely indication that the new data flow originates from the same source as the older data flow with which the suppression index was associated.

In accordance with another algorithm, cable modem 108 performs statistical analysis to determine, over time, which suppression indices are least often used. The statistical analysis is performed off-line in the sense that it is performed as a separate process apart from the assignment and recycling of suppression indices. When the need to determine which suppression index to recycle arises, cable modem 108 utilizes the suppression index that has been least often used based upon the results of the statistical analysis, regardless of whether the suppression index has been recently used.

Figure 9:
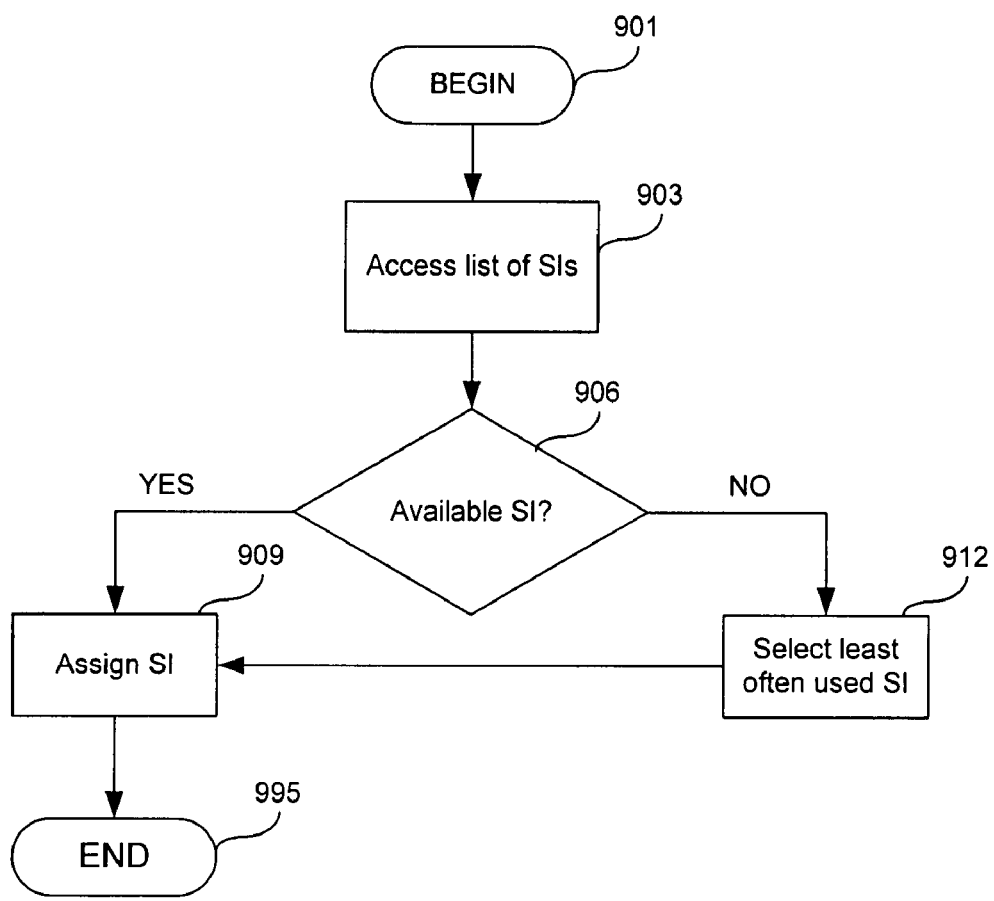
FIG. 9 is an operational flow for assigning and reusing suppression indices in accordance with another embodiment of the present invention.

An implementation of this embodiment can be described with reference to FIG. 4 and FIG. 9. Referring to FIG. 9, flowchart 412 represents another embodiment of step 412. More specifically, flowchart 412 shows another example of a control flow for assigning and reusing suppression indices.

The control flow of flowchart 412 begins at step 901 and passes immediately to step 903. At step 903, cable modem 108 accesses a list of suppression indices that have been "allotted" to cable modem 108.

At step 906, cable modem 108 determines whether all allotted suppression indices have been assigned to a data flow. If not, the control flow passes to step 909. At step 909, a suppression index is assigned to the data flow as discussed above with reference to FIG. 4.

On the other hand, if at step 906 all allotted suppression indices have been assigned to a data flow, the control flow passes to step 912. At step 912, the "least often used" suppression index is selected and recycled. To select the least often used suppression index, statistical analysis is performed to determine, over time, which suppression indices are least often used. In an embodiment, the statistical analysis is performed off-line. However, in another embodiment, the present invention is configured to enable the processing to be performed in real time or near term.

Once the least recently used suppression index is identified, control passes to step 909. At step 909, cable modem 108 utilizes the suppression index that has been least often used based upon the results of the statistical analysis, regardless of whether the suppression index has been recently used. After a suppression index has been assigned or reused, the control flow ends as indicated at step 995.

In accordance with yet another embodiment, cable modem 108 performs a combination of "least recently used" processing and "least often used" processing. In an embodiment, a suppression index is selected for recycling primarily based on "least recent use," as discussed above with reference to FIG. 5 and FIG. 6. However, where two or more suppression indices of approximately the same age are considered for recycling, the index that is recycled is the one that is least often used as determined by statistical analysis.

Figure 10:
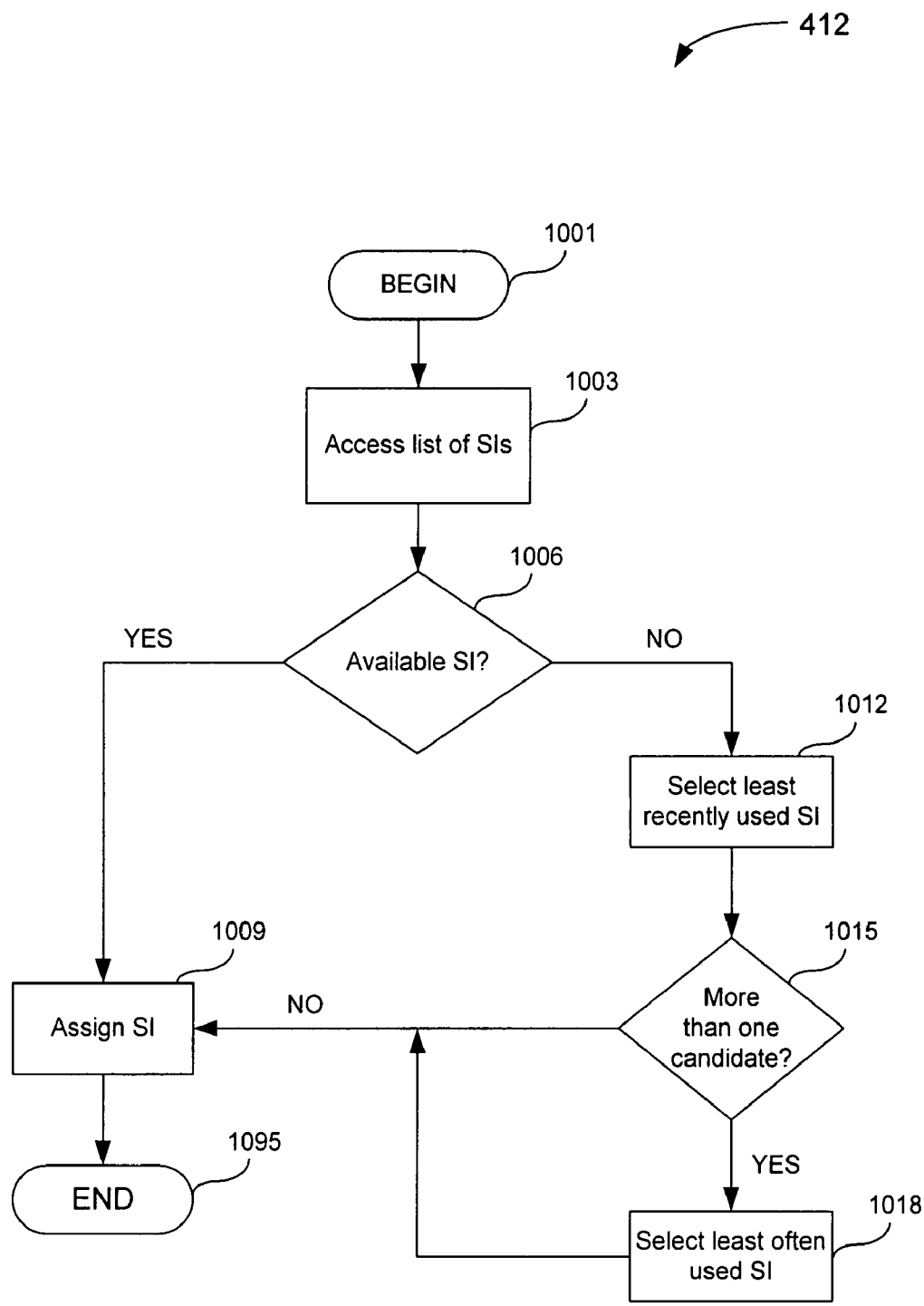
FIG. 10 is an operational flow for assigning and reusing suppression indices in accordance with another embodiment of the present invention.

An implementation of this embodiment can be described with reference to FIG. 4 and FIG. 10. Referring to FIG. 10, flowchart 412 represents another embodiment of step 412. More specifically, flowchart 412 shows another example of a control flow for assigning and reusing suppression indices.

The control flow of flowchart 412 begins at step 1001 and passes immediately to step 1003. At step 1003, cable modem 108 accesses a list of suppression indices that have been "allotted" to cable modem 108.

At step 1006, cable modem 108 determines whether all allotted suppression indices have been assigned to a data flow. If not, the control flow passes to step 1009. At step 1009, a suppression index is assigned to the data flow as discussed above with reference to FIG. 4.

On the other hand, if at step 1006 all allotted suppression indices have been assigned to a data flow, the control flow passes to step 1012. At step 1012, the "least recently used" suppression index is selected and recycled. To select the least recently used suppression index, the aging methodologies and/or techniques described with reference to FIG. 5 and FIG. 6 are implemented.

At step 1015, it is determined whether multiple candidates can be selected as being least recently used. If not, control passes to step 1009 where the identified suppression index is assigned to the newly detected data flow. On the other hand, where two or more suppression indices of approximately the same age are considered for recycling, control passes to step 1018. At step 1018, the suppression index that is selected and recycled is the one that is least often used as determined by statistical analysis. The statistical methodologies and/or techniques described with reference to FIG. 9 are implemented to determine the least recently used suppression index.

Once the least often used suppression index is identified, control passes to step 1009 and the identified suppression index is assigned. After a suppression index has been assigned or reused, the control flow ends as indicated at step 1095.

In another embodiment, a suppression index is selected for recycling based primarily on "least often use." However, where two or more suppression indices that have experienced the same level of usage as determined by statistical analysis are considered for recycling, the suppression index that is recycled is the one that has least recently been used.

Figure 11:
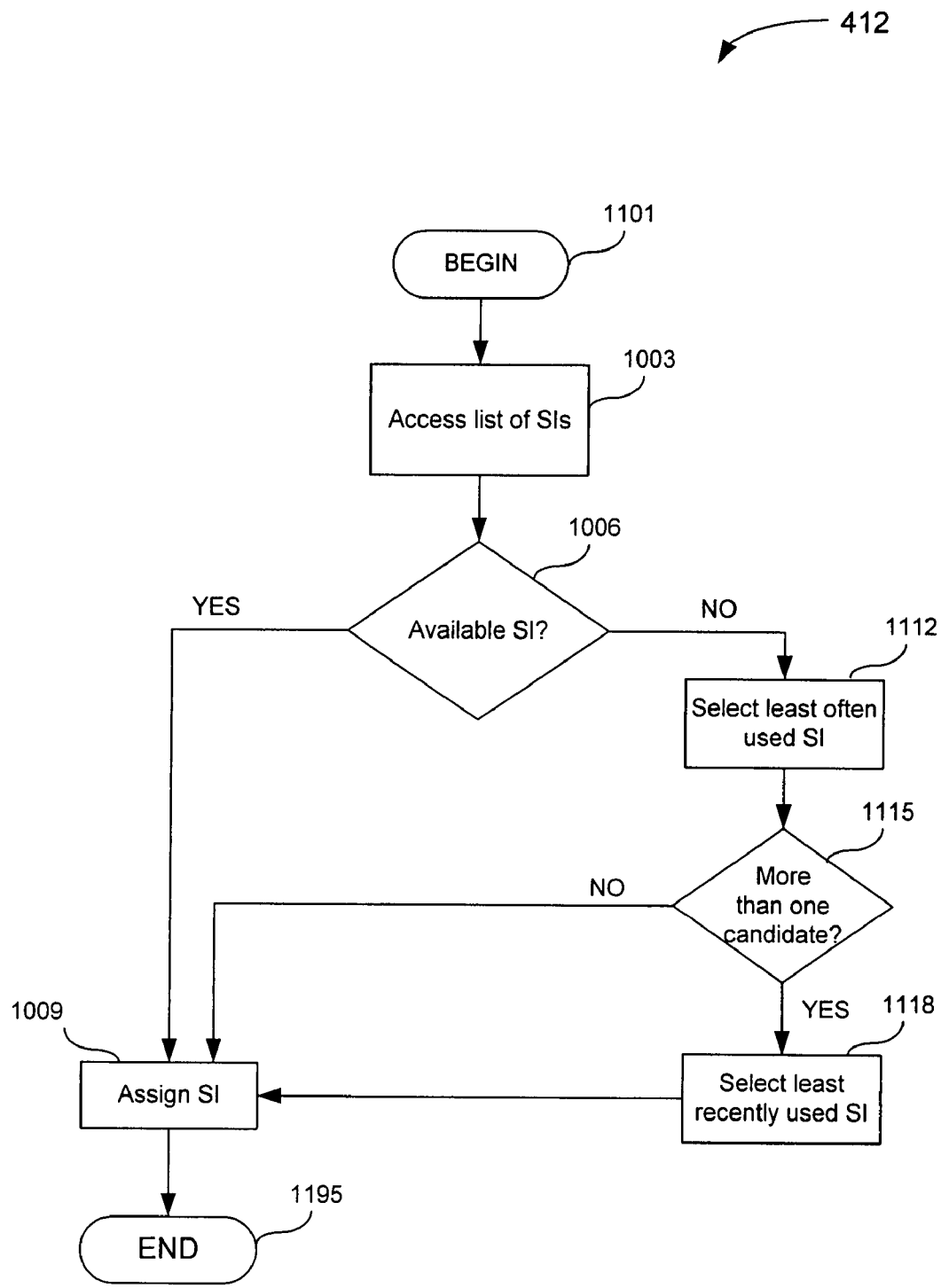
FIG. 11 is an operational flow for assigning and reusing suppression indices in accordance with another embodiment of the present invention.

An implementation of this embodiment can be described with reference to FIG. 4 and FIG. 11. Referring to FIG. 11, flowchart 412 represents another embodiment of step 412. More specifically, flowchart 412 shows another example of a control flow for assigning and reusing suppression indices.

The control flow of flowchart 412 begins at step 1101 and passes to step 1003, step 1006, and step 1009 as described with reference to FIG. 10. In short, if cable modem 108 has an available suppression index that can be assigned to a newly detected data flow, the suppression index is assigned to the data flow at step 1009.

However, if all allotted suppression indices have been assigned and a new data flow is detected, the control flow passes to step 1112. At step 1112, the "least often used" suppression index is selected and recycled. To select the least often used suppression index, the statistical methodologies and/or techniques described with reference to FIG. 9 are implemented.

At step 1115, it is determined whether multiple candidates can be selected as being least often used. If not, control passes to step 1009 where the identified suppression index is assigned to the newly detected data flow. On the other hand, where two or more suppression indices that have experienced the same level of usage are considered for recycling, control passes to step 1118.

At step 1118, the suppression index that is recycled is the one that has least recently been used. The aging methodologies and/or techniques described with reference to FIG. 5 and FIG. 6 are implemented to determine the least recently used suppression index.

Once the least recently used suppression index is identified, control passes to step 1009 and the identified suppression index is assigned. After a suppression index has been assigned or reused, the control flow ends as indicated at step 1195.

VI. Allotting Suppression Indices for Assignment and/or Reuse

The above embodiments pertain to reusing suppression indices after being allotted to cable modem 108. The following embodiments of the present invention relate to alternative embodiments for allotting suppression indices. One embodiment involves using a finite number of suppression indices that are allocated among a plurality of cable modems (e.g., cable modem 108) by a CMTS, such as CMTS 104. This embodiment assumes that on occasion there simply will not be enough suppression indices available to accommodate each cable modem data flow. Consequently, in this approach, CMTS 104 is responsible for intelligently determining which services will not be permitted to perform payload header suppression. For example, this determination can be based on: (1) potential bandwidth savings, with data flows capable of achieving higher bandwidth savings through payload header suppression being allocated suppression indices, or (2) quality or type of service, in which cable modems or data flows with higher levels of service are provided with suppression indices before cable modems or data flows with lower service levels, or, alternately, are not permitted to pass suppressed packets at all in lieu of higher guaranteed bandwidth provisioning. The pool of available suppression indices can be further partitioned based on service levels, modem types, frequency bands used, and other system parameters that result in greater desirability to suppress or lesser desirability to suppress, as will be appreciated by one skilled in the relevant art(s).

Figure 12:
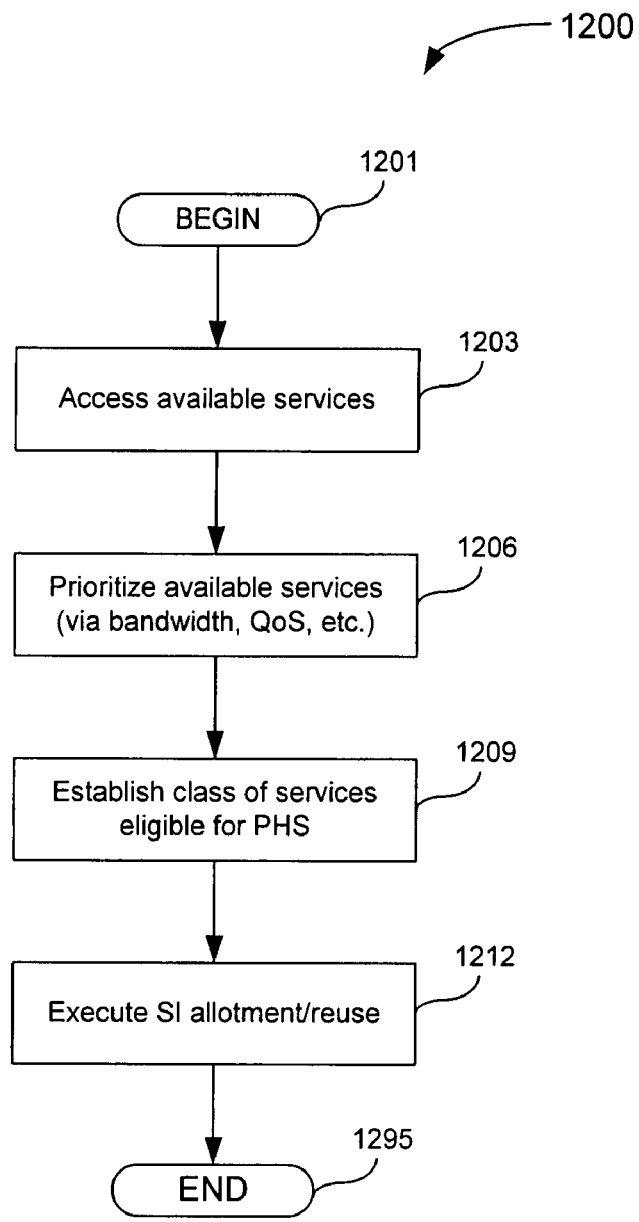
FIG. 12 is an operational flow for allocating and assigning suppression indices in accordance with an embodiment of the present invention.

An implementation of this embodiment is described with reference to FIG. 12. Referring to FIG. 12, flowchart 1200 represents an embodiment of the present invention that shows an example of a control flow for allocating and assigning suppression indices.

The control flow of flowchart 1200 begins at step 1201 and passes immediately to step 1203. At step 1203, cable modem 108 accesses a list of available services. At step 1206, the available services are prioritized based on a performance metric. As discussed, the performance metric can be potential bandwidth savings, quality or type of service, service levels, modem types, frequency, etc.

At step 1209, the available services are categorized into classes eligible for payload header suppression and classes that are not eligible. The categorization is based on the prioritization performed at step 1206.

At step 1212, data flows are assigned a suppression index if it is a member of a class that is eligible for payload header suppression. The control flow, then, ends as indicated at step 1295. Accordingly, flowchart 1200 is a preconditioning process for determining the services that are eligible for payload header suppression. Once a service has been qualified, any of the suppression index assignment or reuse methods can be used as described herein.

In another embodiment for allocating suppression indices, CMTS 104 allocates suppression indices to each cable modem (e.g., cable modem 108) on a first-come first-served basis. CMTS 104 allocates a minimum number of suppression indices to each cable modem 108, and each cable modem 108 then only requests additional indices as required.

Figure 13:
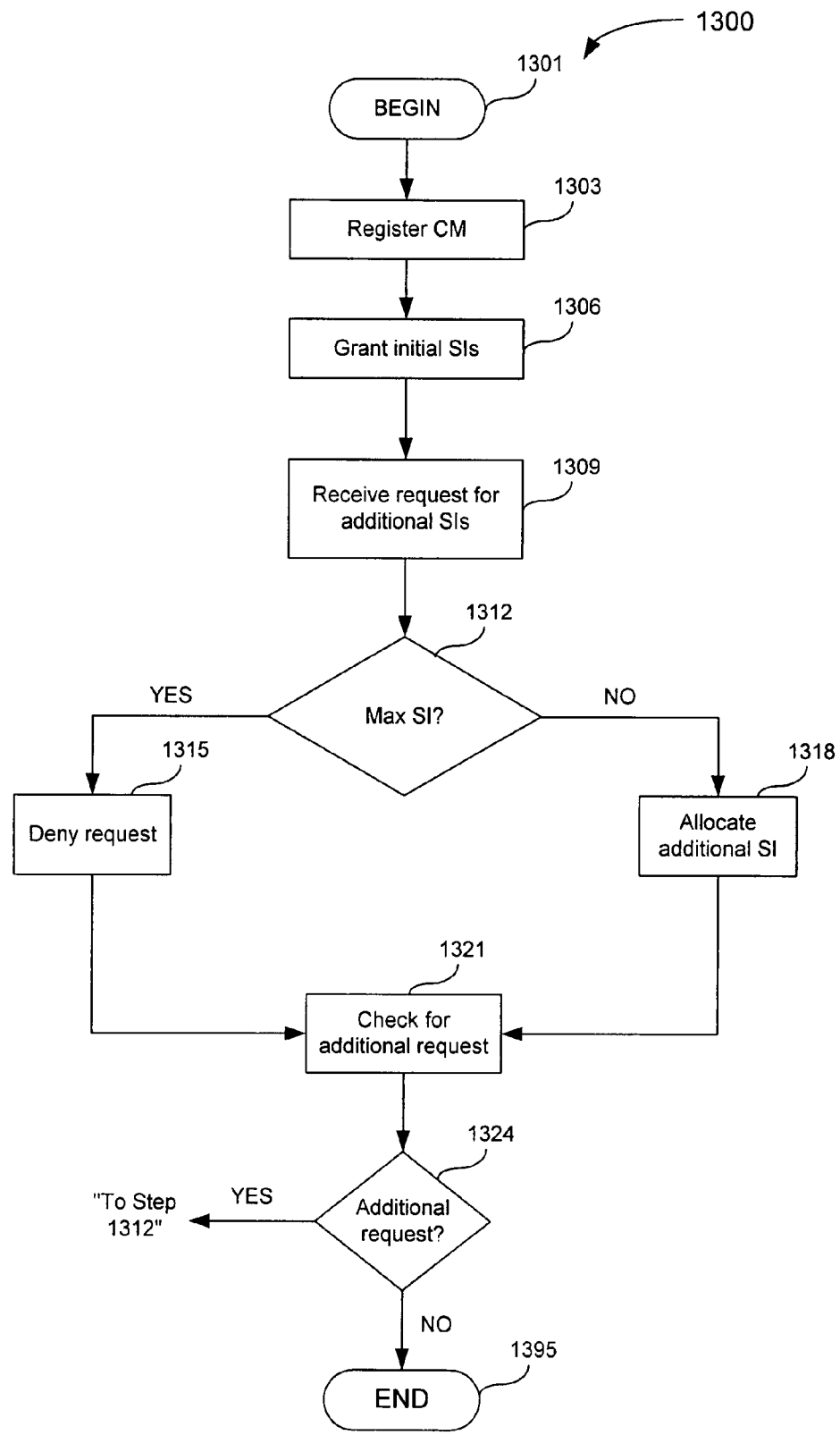
FIG. 13 is an operational flow for allocating and assigning suppression indices in accordance with another embodiment of the present invention.

This embodiment can be implemented as shown in FIG. 13. Referring to FIG. 13, flowchart 1300 represents an embodiment of the present invention that shows another example of a control flow for allocating suppression indices.

The control flow of flowchart 1300 begins at step 1301 and passes immediately to step 1303. At step 1303, cable modem 108 registers with CMTS 104 and receives its respective setup parameters, as outlined by DOCSIS or the like. At step 1306, CMTS 104 sends an initial list of suppression indices to cable modem 108. Cable modem 108 would later assign or reuse the suppression indices according to the methodologies and/or techniques described herein. At step 1309, cable modem 108 sends a request to CMTS 104 for additional suppression indices. A request can be sent prior to implementing a reuse algorithm of the present invention, or concurrently therewith.

At step 1312, CMTS 104 determines whether the maximum number of suppression indices have been allotted to the requesting cable modem 108. If the maximum number has been reached, the request is denied at step 1315. Otherwise, an additional suppression index is allotted to the requesting cable modem 108 at step 1318.

At step 1321, CMTS 104 checks for additional requests for additional suppression indices from the same or other cable modems 108. If additional requests are found, control passes from step 1324 back to step 1312, and the process is repeated. If no additional requests are found, the control flow ends at step 1395.

As described with reference to FIG. 13, once a cable modem 108 has been allotted a maximum number of suppression indices, future requests for additional suppression indices are denied as described at step 1315. In another embodiment, a request is not categorically denied after a cable modem 108 has reached its maximum allowed suppression indices. Instead, where a requesting cable modem 108 requires additional suppression indices, CMTS 104 reduces the number of indices that have been supplied to any cable modem 108 when a drop in bandwidth requirement for that cable modem 108 has been determined by CMTS 104 using an index usage algorithm.

VII. Cable Modem and CMTS Handshake

In accordance with embodiments of the present invention, allocation of suppression indices by CMTS 104 to a cable modem (e.g., cable modem 108) is achieved via a handshake protocol. For example, when cable modem 108 first appears on HFC network 110, cable modem 108 transmits a general request for suppression indices to CMTS 104. In embodiments, this request is made during the cable modem registration process as outlined by DOCSIS. In response to the request for indices, CMTS 104 sends a message to cable modem 108 granting a limited number of suppression indices to cable modem 108. In embodiments, CMTS 104 allocates any number of suppression indices to cable modem 108 based on the techniques described above. For example, CMTS 104 can allocate a limited number of suppression indices to cable modem 108 on the basis of potential bandwidth savings or on quality or type of service.

During ongoing communications between cable modem 108 and CMTS 104, after cable modem 108 has assigned all of its suppression indices and a new data flow is detected (i.e., cable modem 108 has run out of suppression indices), cable modem 108 sends a request for additional suppression indices to CMTS 104. Upon receiving the request, CMTS 104 can allocate additional suppression indices to cable modem 108 by sending an index allocation message to cable modem 108. In embodiments, if the total number of suppression indices allocated to cable modem 108 after the grant by CMTS 104 exceeds a predefined maximum number of suppression indices, cable modem 108 will delete any excess suppression indices as soon as the data flow to which they have been assigned is terminated. In alternative embodiments, CMTS 104 also has the ability to delete suppression indices from cable modem 108 by sending an index deletion message to cable modem 108.

In the protocol discussed above, there is an unavoidable delay between the time that cable modem 108 determines that it requires additional suppression indices and the time that cable modem 108 is actually allocated the additional indices. This is because it takes time for the request for additional indices to be made and granted. Hence, in embodiments, when cable modem 108 must wait for more indices to be allocated, cable modem 108 can either wait for the new indices, use any of the index reuse algorithms described above for reusing suppression indices already allocated to it, or send packets without payload header suppression until more suppression indices have been made available. Where a predetermined maximum number of suppression indices has been reached, the reuse algorithms described above can once again be employed.

It is important to note that any and all of the suppression index reuse algorithms described above can be used either alone or in combination by cable modem 108 and/or CMTS 104. This is because, in embodiments, both cable modem 108 and CMTS 104 can delete suppression indices from cable modem 108. Accordingly, the same or different reuse algorithms can be used by CMTS 104 or cable modem 108. Where CMTS 104 utilizes the algorithms, they can be implemented in software stored in RAM 220 of CMTS 104 and executed by CPU 222 (see the exemplary implementation of CMTS 104 depicted in FIG. 2). Alternately, the suppression index reuse algorithms can be performed by hardware within CMTS 104, such as by headend MAC 218.

VIII. Exemplary System Implementation

FIGS. 1-13 are conceptual illustrations allowing an easy explanation of the present invention. It should be understood that embodiments of the present invention could be implemented in hardware, firmware, software, or a combination thereof. In such an embodiment, the various components and steps would be implemented in hardware, firmware, and/or software to perform the functions of the present invention. That is, the same piece of hardware, firmware, or module of software could perform one or more of the illustrated blocks (i.e., components or steps).

Figure 14:
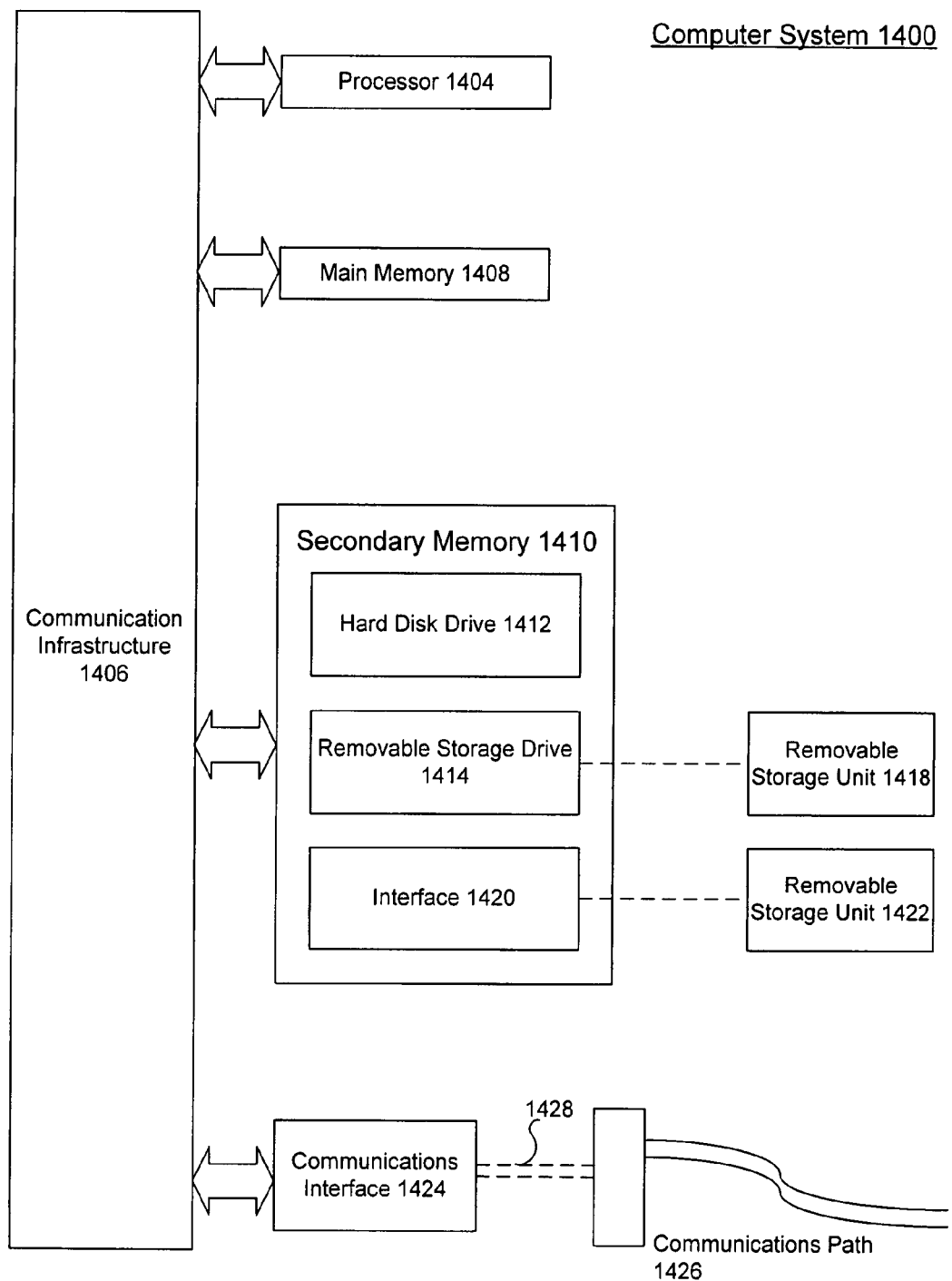
FIG. 14 is an example computer system useful for implementing the present invention.

Additionally, the present invention can be implemented in one or more computer systems capable of carrying out the functionality described herein. Referring to FIG. 14, an example computer system 1400 useful in implementing the present invention is shown. Various embodiments of the invention are described in terms of this example computer system 1400. After reading this description, it will become apparent to one skilled in the relevant art(s) how to implement the invention using other computer systems and/or computer architectures.

The computer system 1400 includes one or more processors, such as processor 1404. Processor 1404 can be a special purpose or a general purpose digital signal processor. Processor 1404 is connected to a communication infrastructure 1406 (e.g., a communications bus, crossover bar, or network).

Computer system 1400 also includes a main memory 1408, preferably random access memory (RAM), and can also include a secondary memory 1410. The secondary memory 1410 can include, for example, a hard disk drive 1412 and/or a removable storage drive 1414, representing a floppy disk drive, a magnetic tape drive, an optical disk drive, etc. The removable storage drive 1414 reads from and/or writes to a removable storage unit 1418 in a well-known manner. Removable storage unit 1418 represents a floppy disk, magnetic tape, optical disk, etc. As will be appreciated, the removable storage unit 1418 includes a computer usable storage medium having stored therein computer software (e.g., programs or other instructions) and/or data.

In alternative implementations, secondary memory 1410 includes other similar means for allowing computer software and/or data to be loaded into computer system 1400. Such means include, for example, a removable storage unit 1422 and an interface 1420. Examples of such means include a program cartridge and cartridge interface (such as that found in video game devices), a removable memory chip (such as, an EPROM or PROM) and associated socket, and other removable storage units 1422 and interfaces 1420 which allow software and data to be transferred from the removable storage unit 1422 to computer system 1400.

Computer system 1400 can also include a communications interface 1424. Communications interface 1424 allows software and/or data to be transferred between computer system 1400 and external devices. Examples of communications interface 1424 include a modem, a network interface (such as an Ethernet card), a communications port, a PCMCIA slot and card, etc. Software and data transferred via communications interface 1424 are in the form of signals 1428 which can be electronic, electromagnetic, optical, or other signals capable of being received by communications interface 1424. These signals 1428 are provided to communications interface 1424 via a communications path (i.e., channel) 1426. Communications path 1426 carries signals 1428 and can be implemented using wire or cable, fiber optics, a phone line, a cellular phone link, an RF link, free-space optics, and/or other communications channels.

In this document, the terms "computer program medium" and "computer usable medium" are used to generally refer to media such as removable storage drive 1414, a hard disk installed in hard disk drive 1412, and signals 1428. These computer program products are means for providing software to computer system 1400. The invention, in an embodiment, is directed to such computer program products.

Computer programs (also called computer control logic or computer readable program code) are stored in main memory 1408 and/or secondary memory 1410. Computer programs can also be received via communications interface 1424. Such computer programs, when executed, enable the computer system 1400 to implement the present invention as discussed herein. In particular, the computer programs, when executed, enable the processor 1404 to implement the processes of the present invention, such as the method(s) implemented using CMTS 104, cable modem 106, cable modem 108, CPU 222, and/or CPU 320 described above, and/or such as methods 400, 412, 700, 1200, and/or 1300, for example. Accordingly, such computer programs represent controllers of the computer system 1400.

In an embodiment where the invention is implemented using software, the software can be stored in a computer program product and loaded into computer system 1400 using removable storage drive 1414, hard drive 1412 or communications interface 1424. The control logic (software), when executed by the processor 1404, causes the processor 1404 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to one skilled in the relevant art(s).

In yet another embodiment, the invention is implemented using a combination of both hardware and software.

While various embodiments of the present invention have been described above, it should be understood that they have been presented by way of example, and not limitation. It will be apparent to one skilled in the relevant art(s) that various changes in form and detail can be made therein without departing from the spirit and scope of the invention. Moreover, it should be understood that the method, system, and computer program product of the present invention should not be limited to transmissions between cable modems and headends. The present invention can be implemented in any multi-nodal communications environment governed by centralized nodes. The nodes include, but are not limited to, communication gateways, switches, routers, Internet access facilities, servers, personal computers, enhanced telephones, personal digital assistants (PDA), televisions, set-top boxes, or the like. Thus, the present invention should not be limited by any of the above-described exemplary embodiments, but should be defined only in accordance with the following claims and their equivalents.

What is claimed is:

1. A method for suppressing payload headers of a data stream based on a particular flow within a wireless device, comprising the steps of:
    detecting an incoming data stream through a wireless communication medium;
    identifying the incoming data stream as corresponding to a particular flow;
    accessing a plurality of suppression indices, wherein the plurality of suppression indices is associated with rules governing suppression and reconstruction of payload headers; and
    reusing with a processing device one of the plurality of suppression indices to produce a reused suppression index in response to determining no suppression index within the plurality of suppression indices being assigned to the particular flow,
    wherein said reusing includes applying the reused suppression index to suppress a payload header corresponding to the incoming data stream.

2. The method according to claim 1, wherein said reusing step further comprises the step of:
    sharing the reused suppression index with its currently assigned flow.

3. The method according to claim 1, wherein said reusing step further comprises the step of:
    disassociating the reused suppression index from its currently assigned flow.

4. The method according to claim 1, wherein said reusing step further comprises the step of:
    reusing a least recently used suppression index to produce the reused suppression index.

5. The method according to claim 4, wherein said reusing step further comprises the step of:
    accessing a timestamp to select the least recently used suppression index.

6. The method according to claim 4, wherein said reusing step further comprises the step of:
    accessing an ordered list to select the least recently used suppression index.

7. The method according to claim 1, wherein said reusing step further comprises the steps of:
    monitoring the flows within the wireless device to detect an inactive suppression index from the plurality of suppression indices; and
    reusing the inactive suppression index to produce the reused suppression index.

8. The method according to claim 1, wherein said reusing step further comprises the steps of:
    comparing a payload header corresponding to the incoming data stream with each payload header corresponding to a respective data stream having an assigned suppression index;
    determining a similar payload header in response to said comparing step; and
    applying the suppression index assigned to the similar payload header to produce the reused suppression index.

9. The method according to claim 1, wherein said reusing step further comprises the step of:
    reusing a least often used suppression index to produce the reused suppression index.

10. The method according to claim 1, wherein said reusing step further comprises the steps of:
    identifying more than one least recently used suppression index; and
    reusing a least often used suppression index to produce the reused suppression index.

11. The method according to claim 1, wherein said reusing step further comprises the steps of:
   identifying more than one least often used suppression index; and
   reusing a least recently used suppression index to produce the reused suppression index.

12. A method for assigning a suppression index to a packet stream in a wireless device, wherein the suppression index is one of a limited number of suppression indices used for suppression of payload headers in the packet stream, comprising the steps of:
   identifying a data stream through a wireless communications medium;
   and selecting a suppression index for assignment to said data stream from the limited number of suppression indices, wherein the limited number of suppression indices is associated with rules governing suppression and reconstruction of payload headers,
   wherein said selecting step comprises selecting with a processing device said suppression index using an index reuse algorithm when all of said suppression indices have already been assigned to a data stream, wherein the index reuse algorithm includes reusing the suppression index from the limited number of suppression indices.

13. The method according to claim 12, wherein said index reuse algorithm selects the suppression index that has been least recently used for transmitting a suppressed data packet.

14. The method according to claim 12, wherein said index reuse algorithm selects the suppression index that has been least often used for transmitting a suppressed data packet.

* * * * *